United States Patent
Goncalves

(10) Patent No.: US 7,238,942 B2
(45) Date of Patent: Jul. 3, 2007

(54) SPECTROMETRIC USING BROADBAND FILTERS WITH OVERLAPPING SPECTRAL RANGES

(75) Inventor: Duarte Paulo da Silva Goncalves, Pretoria North (ZA)

(73) Assignee: CSIR (ZA)

( * ) Notice: Subject to any disclaimer, the term of this patent is extended or adjusted under 35 U.S.C. 154(b) by 277 days.

(21) Appl. No.: 10/476,400

(22) PCT Filed: Apr. 17, 2002

(86) PCT No.: PCT/IB02/01323

§ 371 (c)(1),
(2), (4) Date: Dec. 12, 2003

(87) PCT Pub. No.: WO02/088646

PCT Pub. Date: Nov. 7, 2002

(65) Prior Publication Data

US 2004/0149915 A1    Aug. 5, 2004

(30) Foreign Application Priority Data

May 2, 2001    (ZA) .................................... 01/3531

(51) Int. Cl.
    *G01J 3/51*    (2006.01)
    *G01N 21/64*    (2006.01)
(52) U.S. Cl. .................................... 250/343; 250/458.1
(58) Field of Classification Search ................ 250/343, 250/339.12, 341.8, 338.5
    See application file for complete search history.

(56) References Cited

U.S. PATENT DOCUMENTS

| | | | |
|---|---|---|---|
| 3,992,101 A * | 11/1976 | Dapper et al. | 356/308 |
| 4,345,840 A | 8/1982 | Goetz | |
| 4,560,275 A * | 12/1985 | Goetz | 356/326 |
| 4,678,332 A * | 7/1987 | Rock et al. | 356/328 |
| 5,166,755 A * | 11/1992 | Gat | 356/419 |
| 5,260,574 A * | 11/1993 | Becker | 250/338.1 |
| 5,321,265 A | 6/1994 | Block | |
| 5,424,545 A | 6/1995 | Block | |

(Continued)

FOREIGN PATENT DOCUMENTS

JP    57013328    1/1982

OTHER PUBLICATIONS

M. Severcan, "Restoration of images of finite extent objects by a singular value decomposition technique," Applied Optics, Mar. 15, 1982, vol. 21, No. 6, United States.

*Primary Examiner*—Otilia Gabor
(74) *Attorney, Agent, or Firm*—Marshall A. Lerner; Marvin H. Kleinberg; Kleinberg & Lerner, LLP

(57) ABSTRACT

The invention provides a spectrometer (10) which includes a filter arrangement (16,18), in addition to any option filters (20) for limiting an operational wavelength range of the spectrometer, the filter arrangement (16,18) comprising a plurality of broadband optical filters or broadband optical filter areas each of known transmission and being located or selectively locatable in a path of collected incident spectral radiation (44). The spectrometer further includes at least one detector (24) arranged to measure the spectral radiation passing through at least one of the broadband filters located in the path of collected incident spectral radiation, and signal-processing means (34) for recovering the spectrum of the collected spectral radiation from measurements by the detector (24).

12 Claims, 13 Drawing Sheets

U.S. PATENT DOCUMENTS

| | | |
|---|---|---|
| 5,434,412 A | 7/1995 | Sodickson |
| 5,461,477 A * | 10/1995 | Marinelli et al. ............ 356/454 |
| 5,612,784 A * | 3/1997 | Curbelo ...................... 356/451 |
| 5,672,875 A | 9/1997 | Block |
| 5,793,545 A * | 8/1998 | Monfre et al. ............... 359/891 |
| 5,818,044 A | 10/1998 | Sodickson |
| 5,818,045 A * | 10/1998 | Mark et al. ............ 250/339.12 |
| 5,818,048 A | 10/1998 | Sodickson |
| 6,028,311 A | 2/2000 | Sodickson |
| 6,064,065 A | 5/2000 | Block |
| 6,072,180 A * | 6/2000 | Kramer et al. ............ 250/341.6 |
| 6,201,989 B1 * | 3/2001 | Whitehead et al. ......... 600/476 |
| 6,222,189 B1 | 4/2001 | Misner |
| 6,455,851 B1 * | 9/2002 | Lord et al. ................ 250/338.5 |
| 6,545,272 B1 * | 4/2003 | Kondo ....................... 250/305 |
| 6,903,329 B2 * | 6/2005 | Gentala ...................... 250/238 |

* cited by examiner

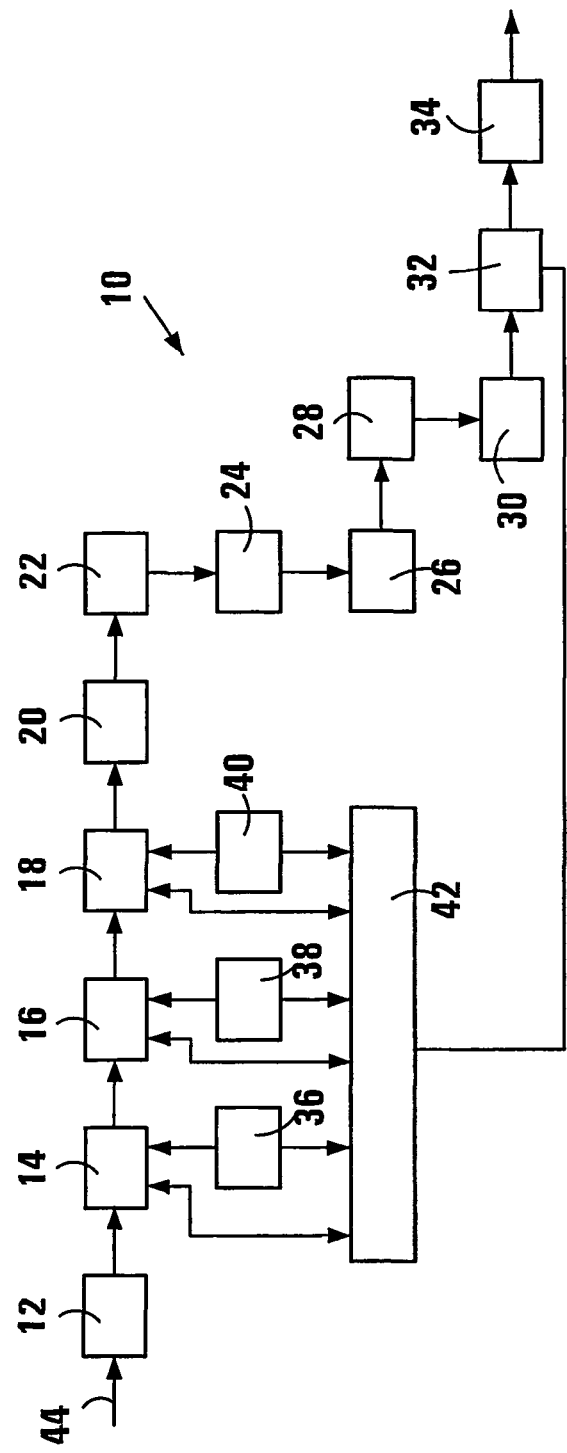
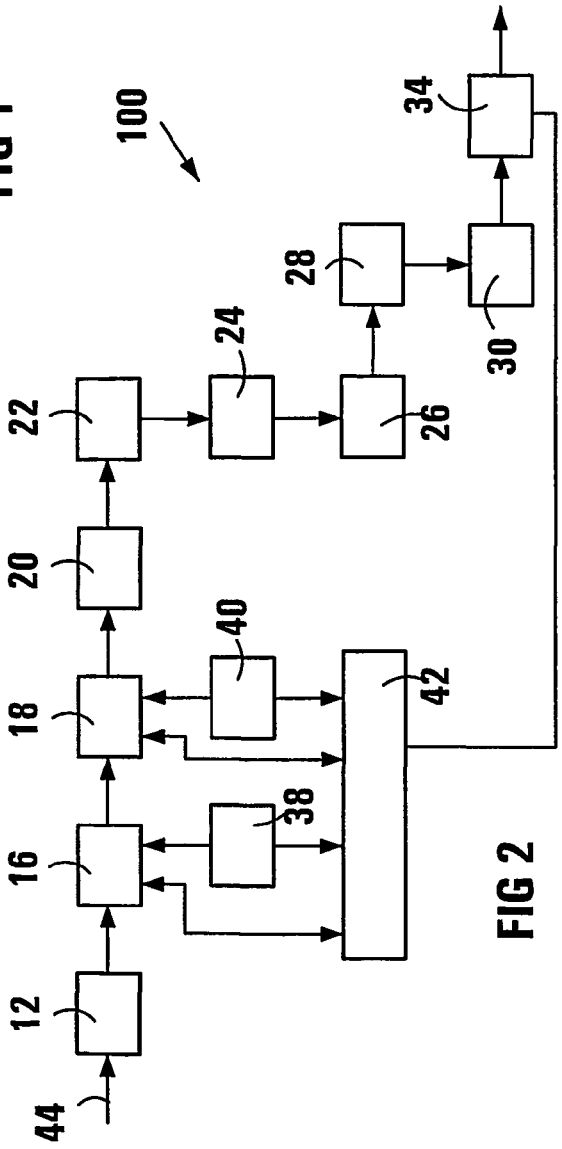

SPECTROMETRIC USING BROADBAND FILTERS WITH OVERLAPPING SPECTRAL RANGES

THIS INVENTION relates to spectrometric devices. In particular, it relates to a spectrometer or spectro-radiometer or the like devices, and to a method of recovering a signal.

The conventional spectrometric devices known to the Applicant all suffer from inherent disadvantages. Thus, a spectrometer using narrow band optical filters or prisms or gratings suffers from a poor signal to noise ratio and low throughput. Fourier Transform Spectrometers, such as the Fourier Transform Infra-Red (FTIR) spectrometer, although possessing a multiplex advantage, and having a high throughput, are very expensive and not robust, requiring high tolerance components. Thus, the distance that the mirror moves relative to the beam splitter of a Fourier Transform Spectrometer is very small, in the order of nanometers, particularly if the spectrometer is intended for use in the visual light spectrum. As will be appreciated, this makes it very difficult to build a Fourier Transform Spectrometer for use in the visual light spectrum. Furthermore, a Fourier Transform Spectrometer suffers from a field of view dependent wavenumber shift or phase difference among the different pixels in the field of view. A spectrometer using an acousto-optical tunable filter (AOTF) suffers from the disadvantage that the power of the radio frequency used to set up the acoustic wave in the crystal must be limited to inhibit unpredictable inter-modulation. An AOTF spectrometer is costly to build and a crystal for use in the 8 to 12 µm spectral radiation range has not been identified.

According to one aspect of the invention, broadly, there is provided a spectrometer which includes a filter arrangement, in addition to any optional filters for limiting an operational wavelength range of the spectrometer, the filter arrangement comprising a plurality of broadband optical filters or broadband optical filter areas each of known transmission and being located or selectively locatable in a path of collected incident spectral radiation.

In this specification, the term spectrometer is intended to include spectrometric devices such as spectro-radiometers, spectrographs, and like devices, whether imaging or point devices and, for a spectrometer having an operational wavelength range from a lower operational wavelength $\lambda_L$ to an upper operational wavelength $\lambda_U$ and with a spectral resolution $\Delta\lambda$, a broadband filter is defined as a filter with a spectral transmission $\tau(\lambda)$ which is significantly greater than 0 over a wavelength region greater than the spectral resolution $\Delta\lambda$ of the device. In other words, a measurement of the spectral radiation passing through the broadband filter does not allow direct measurement of the incident spectrum over the spectral resolution $\Delta\lambda$. Further, in this specification, a prime (') is used to indicate a vector or matrix transpose.

More particularly according to the invention, there is provided a spectrometer which includes a filter arrangement, in addition to any optional filters for limiting an operational wavelength range of the spectrometer, the filter arrangement comprising a plurality of broadband optical filters or broadband optical filter areas each of known transmission and being located or selectively locatable in a path of collected incident spectral radiation;

at least one detector arranged to measure the spectral radiation passing through at least one of the broadband filters located in the path of collected incident spectral radiation; and signal-processing means for recovering the spectrum of the collected spectral radiation from measurements by the detector.

The spectrometer of the invention thus does not require narrow band filters of any form, dispersive elements such as gratings or prisms, beamsplitters, or the like to function. Instead, in the place of these conventional spectrometer elements, a filter arrangement comprising a plurality of broadband optical filters or broadband optical filter areas each of known transmission is used.

Typically, the spectrometer includes collecting optics for collecting spectral radiation and focussing the collected spectral radiation on one or more of the broadband filters or filter areas. The spectrometer may also include focusing optics for focusing spectral radiation passing through the one or more broadband filters or filter areas on to the at least one detector.

The spectrometer may include a spectral band-pass filter between the filter arrangement and the at least one detector, typically between the filter arrangement and the focusing optics, to limit the operational wavelength range of the spectrometer. Preferably, the spectral band-pass filter has practically zero spectral radiation transmission outside the range $\lambda_L$ to $\lambda_U$.

The filter arrangement may include a filter set with a plurality of unique and individual broadband filters or filter areas. Preferably, in this case, all the broadband filters or filter areas are linearly independent, i.e. the transmission of any one broadband filter or filter area is preferably not a multiple of the transmission of any other broadband filter or filter area. In one embodiment of the invention, the filter arrangement includes at least two filter sets arranged one in front of the other to provide broadband filter combinations. Most preferably, the filter arrangement includes only two filter sets, to ensure a high throughput through the filter arrangement, whilst retaining the advantage of reduced cost.

Each filter set may be in the form of a filter wheel.

The spectrometer may include locating means for selectively locating the broadband filters or filter areas in the path of collected incident spectral radiation.

When the filter arrangement includes two filter sets, the locating means may be configured to locate one filter or filter area on one filter set in the path of collected incident spectral radiation whilst successively locating each filter or filter area of the other filter set in the path of collected incident spectral radiation, thereby forming a plurality of broadband filter combinations. Typically, this implies that if the filter sets are in the form of filter wheels, one filter set turns one index position, and the other filter set turns through all index positions.

Each broadband filter combination may be unique and individual and preferably each broadband filter combination is linearly independent of every other broadband filter combination. Preferably, the broadband filter combinations are selected to maximise the signal to noise ratio over the wavelength range $\lambda_L$ to $\lambda_U$.

The spectrometer may be configured to measure N wavelength bands, i.e. it may have a spectral resolution $\Delta\lambda=(\lambda_U-\lambda_L)/N$ and the spectrometer may include J broadband filters or filter areas or J filter or filter area combinations, where $J \geq N \geq 2$. Preferably, $J>N$ to improve the signal to noise ratio. When the filter arrangement includes two filter sets, each filter set may thus comprise M broadband filters or filter areas where $J=M^2$ or, in other words, the number of filters or filter areas equals 2M instead of J.

The filter arrangement may be configured to allow the spectrometer of the invention to operate in the visual and near infrared spectrums, e.g. 400-800 nm, 3-5 μm and 8-12 μm spectrums.

The filters or filter areas may be thin film filters or absorption filters.

The spectrometer may include a detector associated with each broadband filter or filter area or with each filter or filter area combination which can exist simultaneously, allowing simultaneous sampling of each filter or filter area or each actual filter or filter area combination. Such a spectrometer provides the benefit of high speed measurement, in addition to the benefits of multiplexing and high throughput. Although the detectors each may have a slightly different point of view this may not be an issue if either the spectrometer or the scene viewed by the spectrometer is moving.

The signal-processing means may be configured, for J measured digital signals received by it and each digital signal corresponding to a measurement taken for a particular filter or filter combination, to arrange the J measured digital signals in a vector d, where the vector d=Bs+v and B is a matrix whose row vectors represent the effects of any hardware components, used to obtain the measured digital signals, on the measured digital signals, s is the incident spectrum and v is a noise vector, and to multiply a signal recovery matrix G with the vector d of the measured digital signals, to provide the measured incident spectrum $\hat{S}$, i.e. $\hat{S}$=G d where G=$V\Lambda_r U'$ or the pseudo inverse of B;

$\Lambda_r$=diag$\{1/\gamma_1, \ldots, 1/\gamma_r, 0, \ldots, 0\}$, the subscript r indicating that only the r largest singular values are used; and B=$U\Sigma V'$, the singular value decomposition of B, where U and V are J×N and N×N orthogonal matrices, the matrix $\Sigma$ is a N×N diagonal matrix containing the singular values of B in descending order, i.e. $\Sigma$=diag$\{\gamma_1, \ldots, \gamma_N\}$, $\gamma_1 \geq \gamma_2 \ldots \geq \gamma_N \geq 0$, and r is an integer in the range $1 < r \leq N$ selected to minimize the measurement error.

According to another aspect of the invention, there is provided a method of obtaining a measurement of an incident spectrum s over N wavelength bands or zones, the method including filtering the incident spectrum s through J optical broadband filters or filter combinations to provide J individual filtered spectrums;

converting the J filtered spectrums to J measured analogue electrical signals;

converting the J measured analogue electrical signals to a vector d of J measured digital signals, where the vector d=Bs+v and B is a matrix whose row vectors represent the effects of any hardware components, used to obtain the measured digital signals, on the measured digital signals, and v is a noise vector; and multiplying a signal recovery matrix G with the vector d of the measured digital signals, to provide the measured incident spectrum $\hat{S}$, i.e. $\hat{S}$=G d where G=$V\Lambda_r U'$ or the pseudo inverse of B;

$\Lambda_r$=diag$\{1/\gamma_1, \ldots, 1/\gamma_r, 0, \ldots, 0\}$, the subscript r indicating that only the r largest singular values are used; and B=$U\Sigma V'$, the singular value decomposition of B, where U and V are J×N and N×N orthogonal matrices, the matrix $\Sigma$ is a N×N diagonal matrix containing the singular values of B in descending order, i.e. $\Sigma$=diag$\{\gamma_1, \ldots, \gamma_N\}$, $\gamma_1 \geq \gamma_2 \ldots \geq \gamma_N \geq 0$, and r is an integer in the range $1 < r \leq N$ selected to minimize the measurement error.

The matrix B may include values or elements in its row vectors reflecting the effects of any hardware components, used to obtain the measured digital signals, on the measured digital signals, the effect being selected from the group of effects consisting of a detector pre-amplifier voltage gain, the transmission of any collecting optics, the transmission of any focusing optics, the throughput of optical elements, the transmission of any filter or filters for limiting the wavelength range of the incident spectrum $\bar{s}$, the transmission of the broadband filters or filter combinations, a detector responsivity, or two or more of these.

The invention will now be described, by way of Examples, and with reference to the accompanying exemplary diagrammatic drawings in which FIG. 1 shows a block diagram of one embodiment of a spectrometer in accordance with the invention;

FIG. 2 shows a block diagram of another embodiment of a spectrometer in accordance with the invention, for use in the visual/near infrared spectrum;

Figure 9:
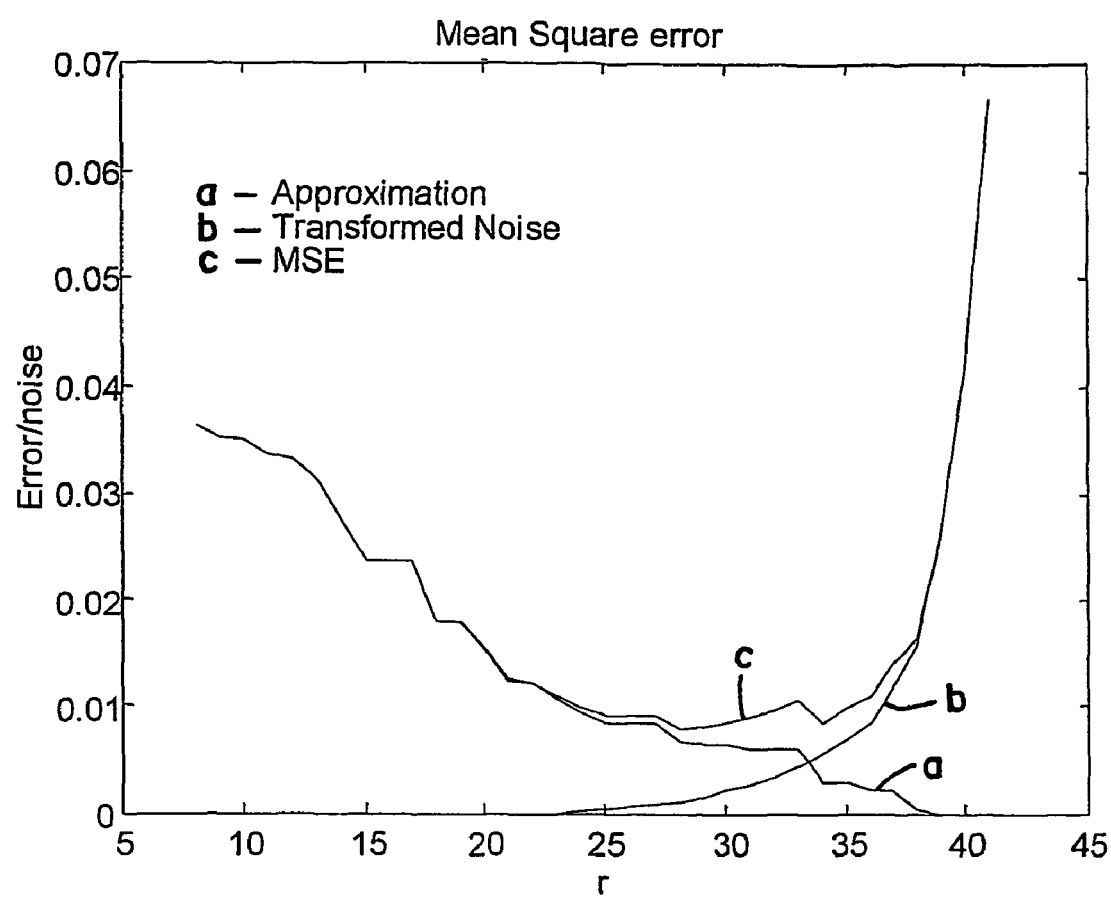
Figure 10:
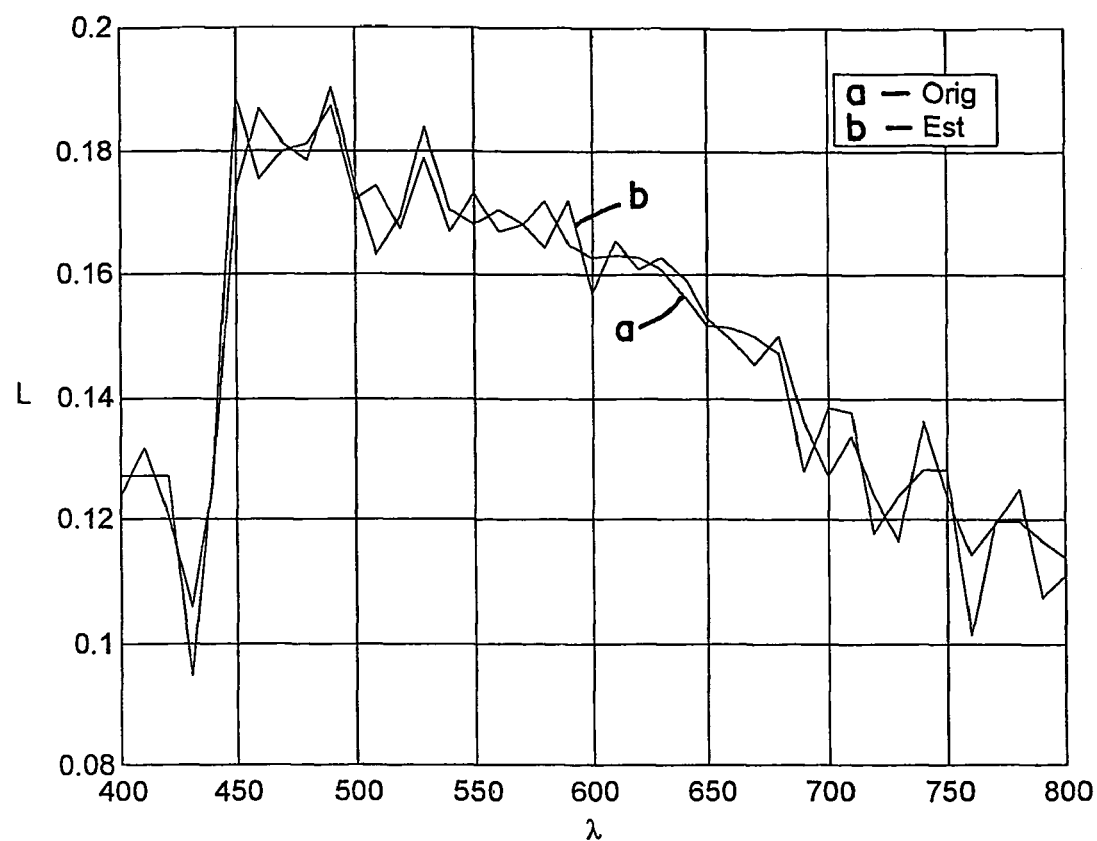
Figure 11:
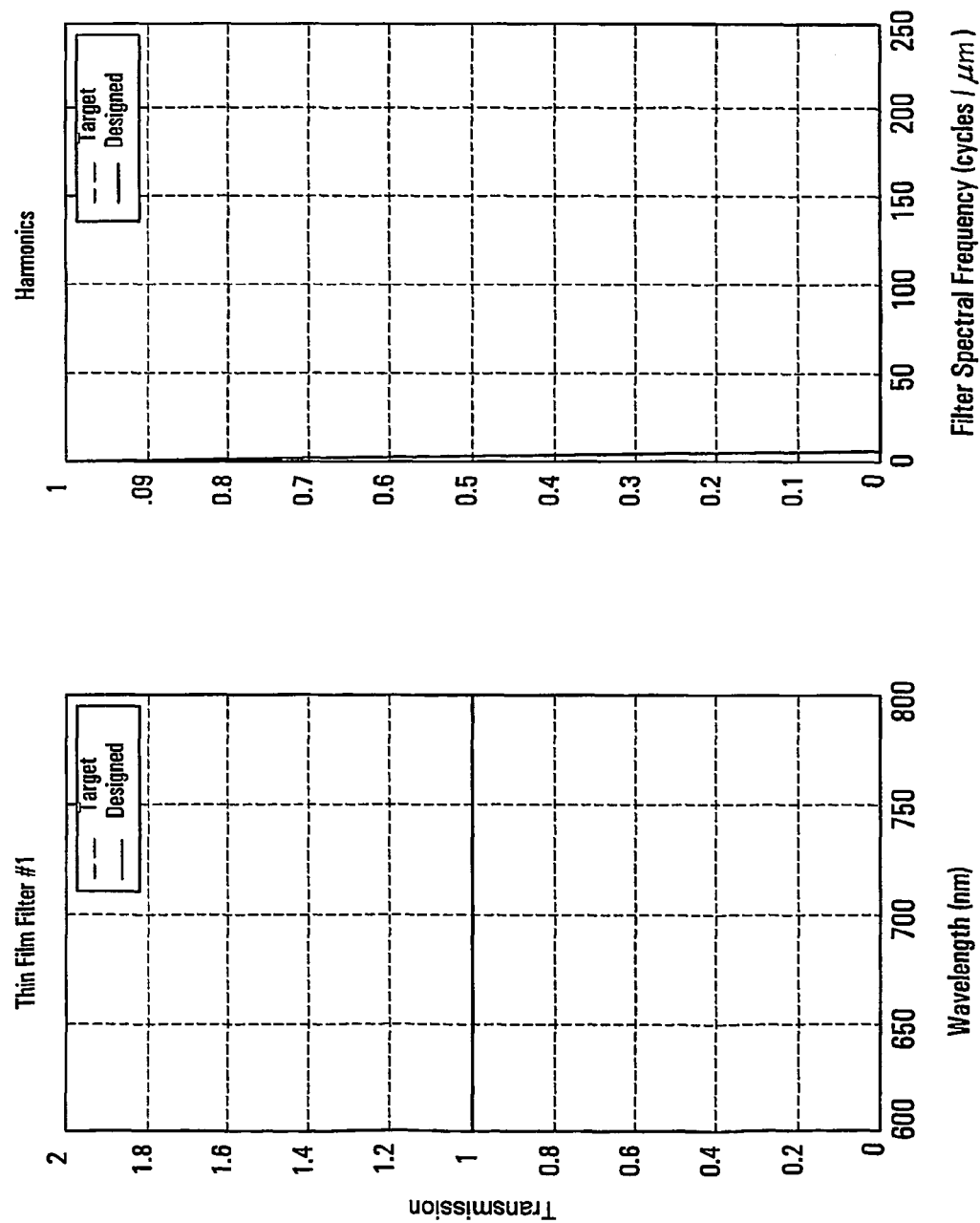
Figure 12:
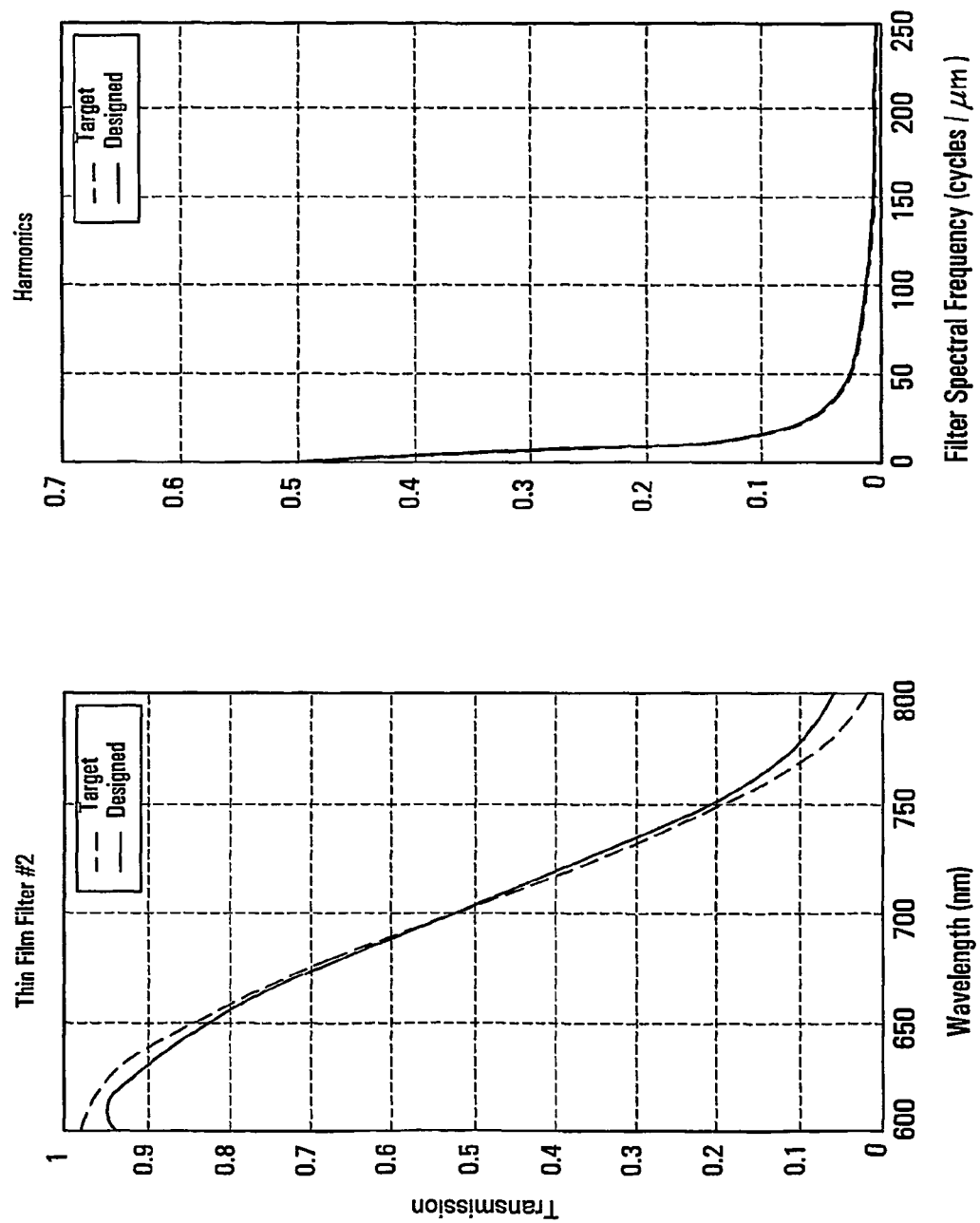
Figure 13:
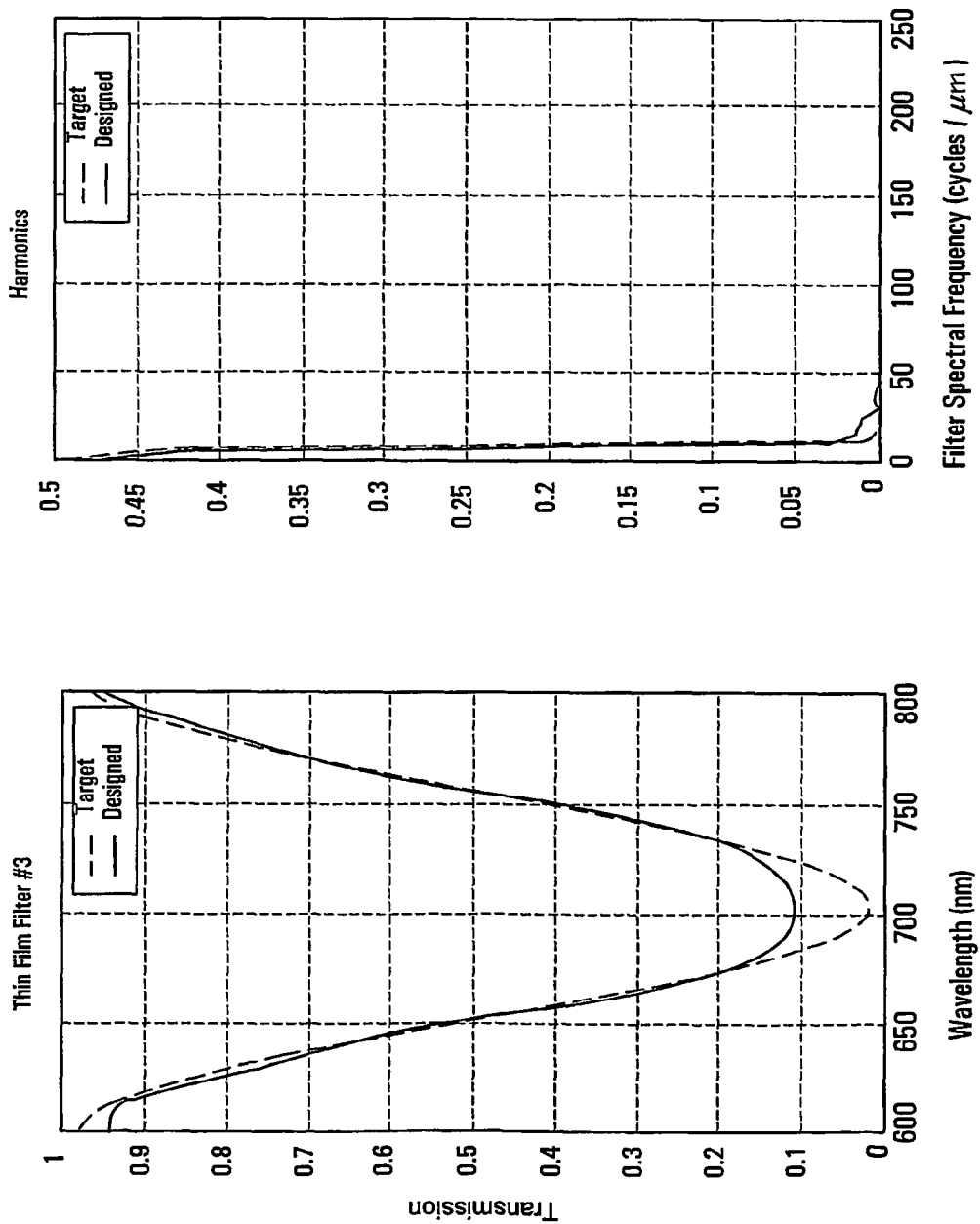
Figure 14:
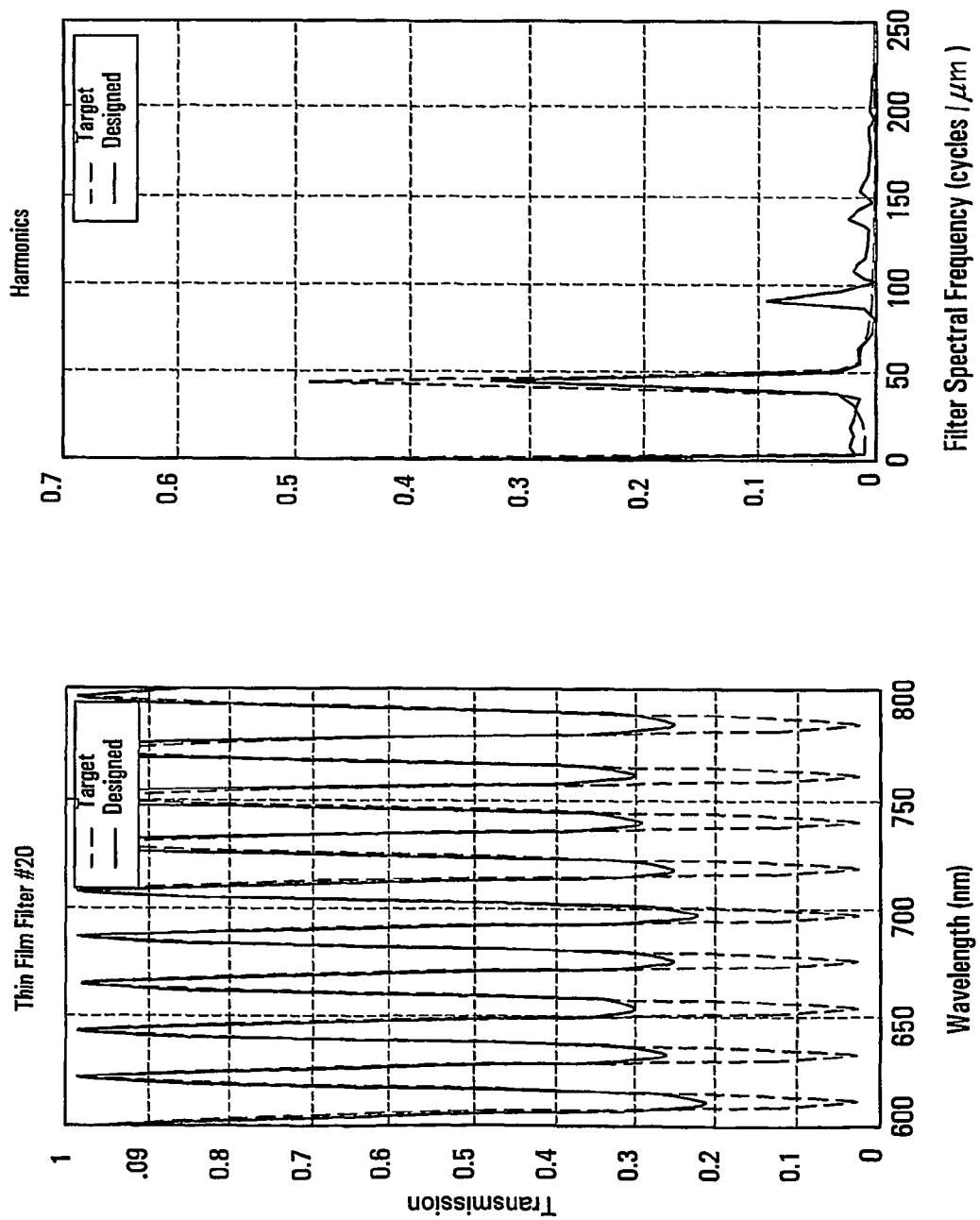
Figure 15:
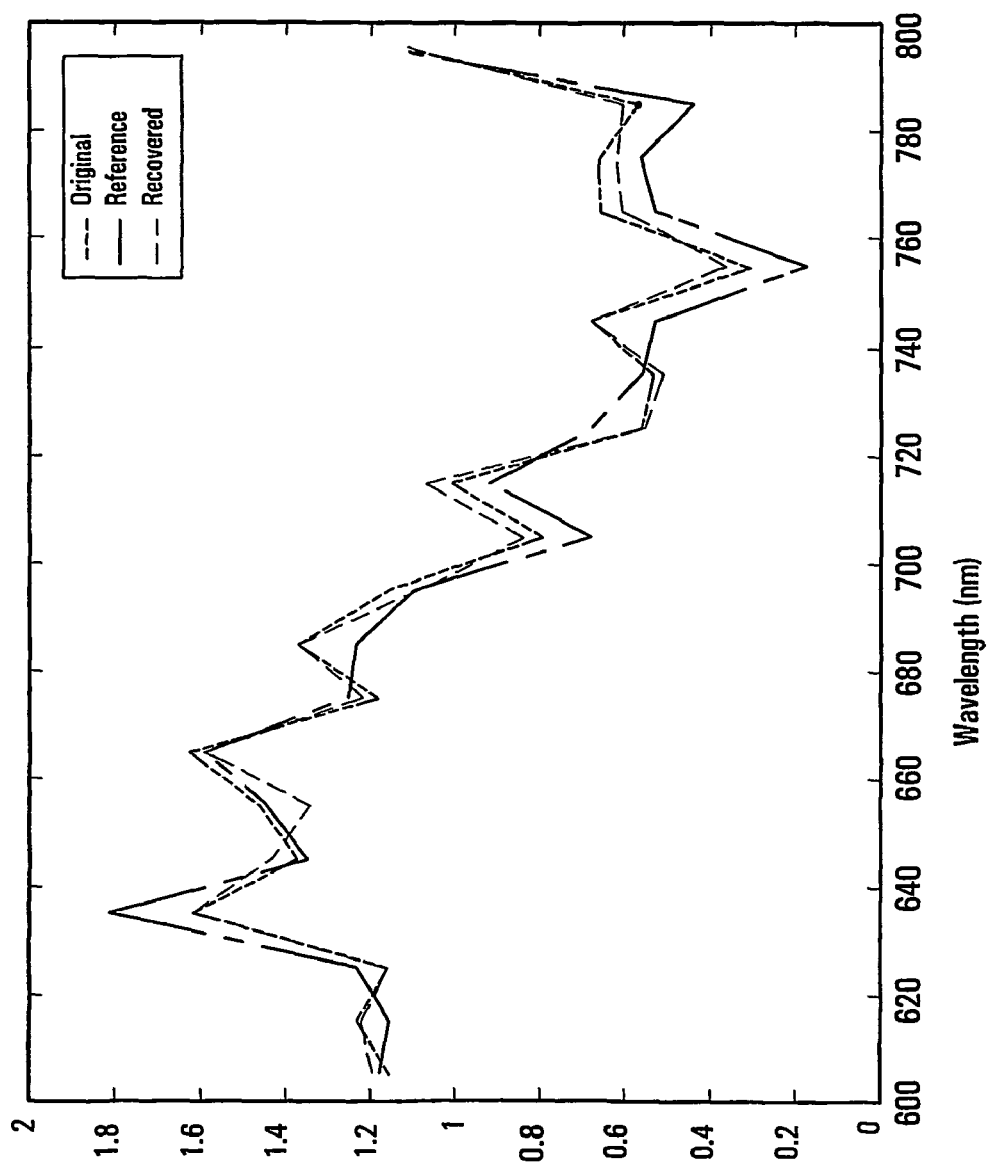
Figure 16:
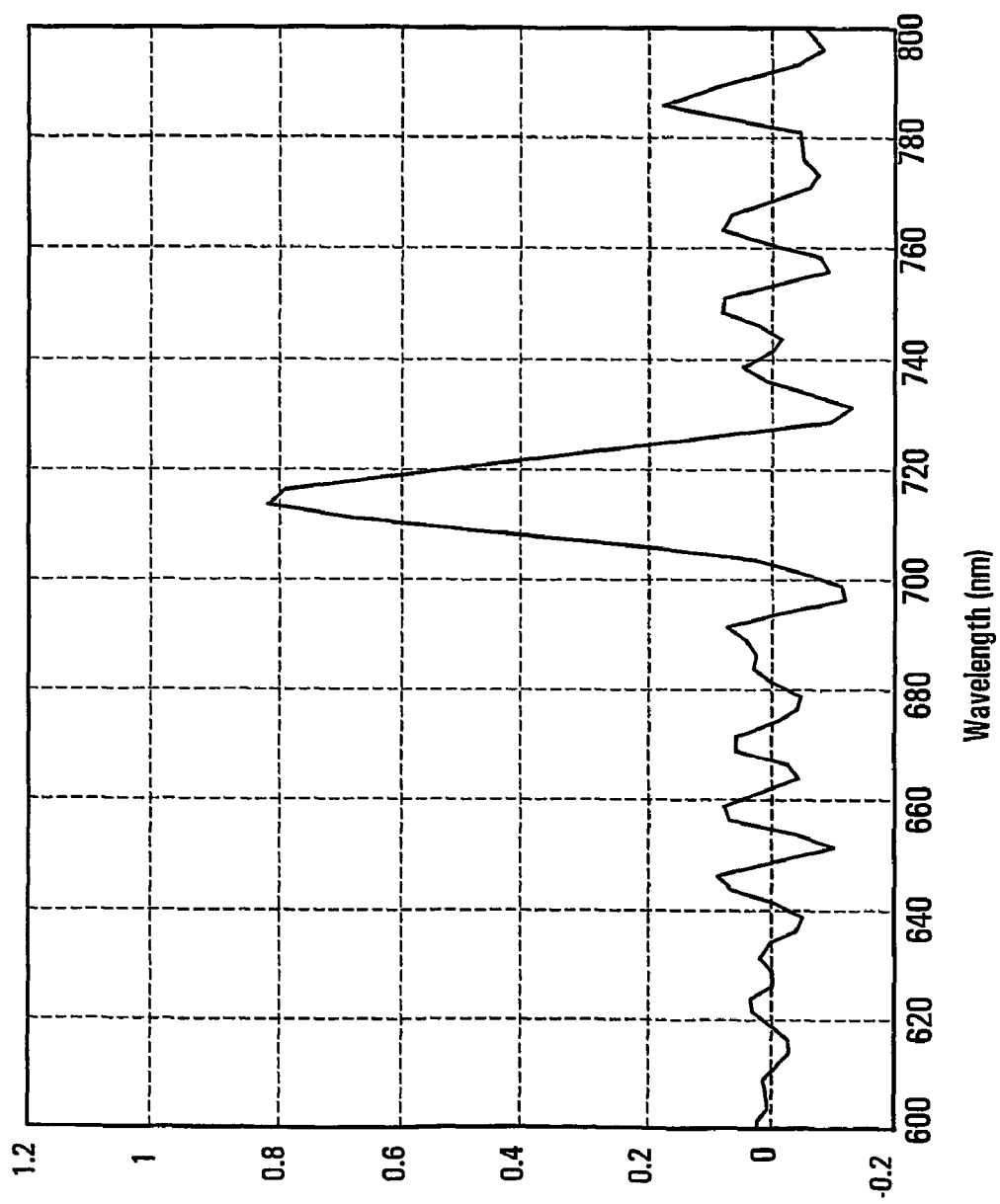

FIG. 9 graphically illustrates the mean square error, approximation error and transformed noise of a measured spectrum using the spectrometer of FIG. 1, as a function of rank;

FIG. 10 graphically illustrates an original or incident spectrum and a spectrum measured or recovered by the spectrometer of FIG. 1;

FIG. 11 graphically illustrates the transmission and harmonics of a first thin film filter of an example filter set for taking measurements in twenty spectral bands, with target and designed transmission being identical;

FIG. 12 graphically illustrates the transmission and harmonics of a second thin film filter of the example filter set;

FIG. 13 graphically illustrates the transmission and harmonics of a third thin film filter of the example filter set;

FIG. 14 graphically illustrates the transmission and harmonics of a twentieth thin film filter of the example filter set;

FIG. 15 graphically illustrates an original or incident spectrum, a spectrum measured or recovered by means of a simulation of a spectrometer in accordance with the invention and in accordance with Example 2, and a spectrum measured or recovered by means of a simulation of a narrowband prism or grating type spectrometer with the same noise as the simulated spectrometer in accordance with the invention; and FIG. 16 graphically illustrates the Instrument Line Shape (ILS) of the simulated spectrometer of Example 2.

Referring to FIG. 1 of the drawings, reference numeral 10 generally indicates a spectrometer in accordance with the invention. The spectrometer 10 can be used in the infrared spectrum, but the embodiment shown in FIG. 1 is configured for use in the visual spectrum.

The spectrometer 10 includes conventional collecting optics 12, a conventional modulator 14, a first filter wheel 16, a second filter wheel 18, a spectral band-pass filter 20, a conventional focusing optics 22, a detector 24, a detector pre-amplifier 26, an analogue band-pass filter 28, an analogue/digital (A/D) converter 30, a demodulator 32, and a signal processor 34. The spectrometer 10 further includes three actuators 36, 38, 40 and a controller 42.

The modulator 14, filter wheels 16, 18, spectral band-pass filter 20, focusing optics 22 and detector 24 are in use arranged to be in the path of incident light collected by the collecting optics and indicated by arrow 44.

The spectral band-pass filter 20 removes light with wavelengths less than 400 nm and more than 800 nm. This limits the operational wavelength of the spectrometer to the visual spectral range of 400 to 800 nm.

Figure 6:
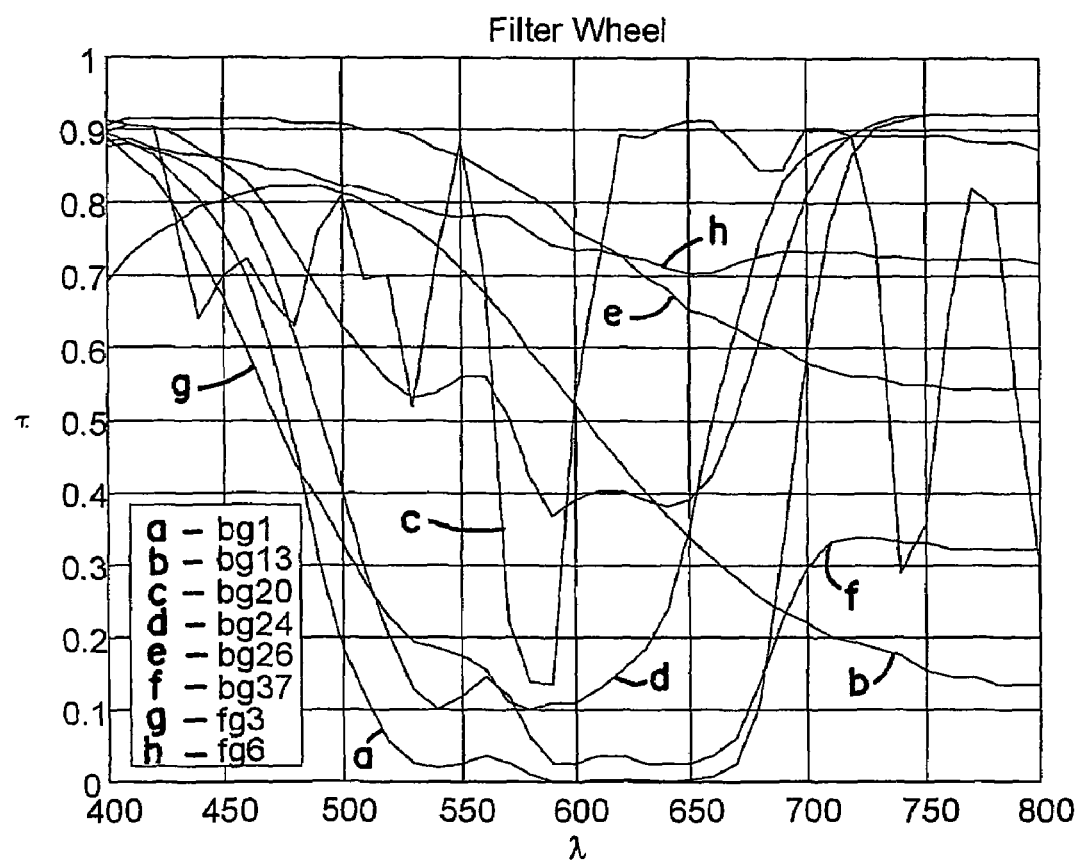
FIG. 6 shows the transmission of filters on a first filter wheel, comprising eight filters, of the spectrometer of FIG. 1.
Figure 7:
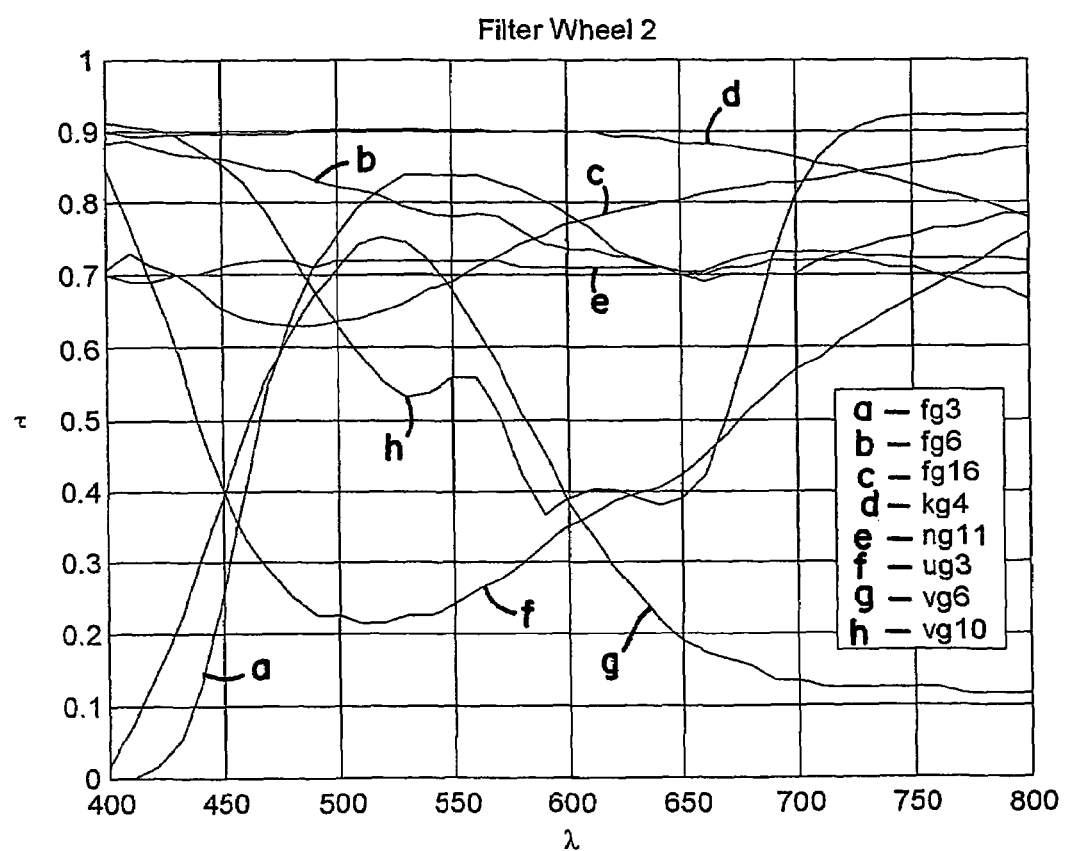
FIG. 7 shows the transmission of filters of a second filter wheel, comprising eight filters, of the spectrometer of FIG. 1.

The first filter wheel 16 comprises eight optical broadband filters obtained commercially from Schott Glaswerke, Germany. The eight filters each has a particular transmission as shown in FIG. 6 of the drawings, over the spectral range of 400 to 800 nm. Similarly, the second filter wheel 18 comprises eight optical broadband filters obtained commercially from Schott Glaswerke, Germany and the transmissions of the eight filters on the second filter wheel are shown in FIG. 7 of the drawings, over the spectral range of 400 to 800 nm. The filters on the first and second filter wheels 16, 18 have not been selected for optimum performance, i.e. to maximize the signal to noise ratio over the wavelength range of 400 to 800 nm. In FIGS. 6 and 7 of the drawings, the Schott Glaswerke filters are identified by their Schott Glaswerke identification codes. Although the filters have not been optimized, each filter on a particular filter wheel 16, 18 is linearly independent from all the other filters on the filter wheel 16, 18.

The controller 42 and the actuator 38, 40 are configured to maintain the first filter wheel 16 in a particular index position whilst rotating the second filter wheel 18 stepwise through 360° or eight index positions. In this fashion, eight combinations between a particular filter on the first filter wheel 16 and the eight filters on the second filter wheel 18 are obtained. Once the second filter wheel 18 has rotated through 360°, the first filter wheel 16 rotates through 45° or one index position to bring another filter on the filter wheel 16 into position in the path of the collected incident spectrum, and the second filter wheel 18 again rotates stepwise through 360° to provide eight further filter combinations. In this fashion, the first filter wheel 16 and the second filter wheel 18 provide sixty-four broadband filter combinations.

As is indicated in FIG. 1 of the drawings, the controller 42 also controls the modulator 14 by means of the actuator 36, and the demodulator 32. The modulation/demodulation functions are known to those skilled in the art and are not discussed in any further detail.

With reference to FIG. 2 of the drawings, a spectrometer for use in the visual/near infrared spectrum is generally indicated by reference numeral 100. The spectrometer 100 is similar to the spectrometer 10 and unless otherwise indicated, the same reference numerals used in relation to the spectrometer 10 are used in relation to the spectrometer 100, for the same parts or features.

Unlike the spectrometer 10, the spectrometer 100 does not include the modulator 14, actuator 36 or demodulator 32. As is known to those skilled in the art, these features are not necessary for a spectrometer used in the visual/near infrared spectrum.

In the discussions that follow, reference is made only to the spectrometer 10; however, it is to be understood that any reference to the spectrometer 10 hereinafter is also a reference to the spectrometer 100, unless inapplicable.

The signal processor 34 is configured to recover the spectrum of incident or collected spectral radiation from measurements by the detector 24 of the spectrums passing through the sixty-four broadband filter combinations. The configuration or programming of the signal processor 34 is based on certain models and assumptions, which are described in more detail below. The spectrometer 10 is configured to provide measurements over N spectral bands and uses J measurements to achieve this, where $J \geq N$.

For an optical/radiometric model, it is assumed that the collecting and focusing optics 12, 22 have spectrally flat transmissions $\tau_{L1}$ and $\tau_{L2}$. Each filter wheel 16, 18 is modelled as having transmission, $0 \leq \tau_{FW1}(\lambda, m_1) \leq 1$ and $0 \leq \tau_{FW2}(\lambda, m_2) \leq 1$ for $m_1, m_2 = 1, \ldots, M$. The transmission of the filter wheels 16, 18 is thus a function of wavelength $\lambda$ and an angular position index m of the filter wheels 16, 18. The transmission of the chosen substrate of the filters of the filter wheels 16, 18 should be insensitive to temperature variations over the operational temperature range of the spectrometer 10. Some constraints on the average combined transmission may be required over the spectral band of interest so that a multiplex advantage is not lost. Specifically, it is required that the filters be non-orthogonal, i.e.

$$\frac{1}{\lambda_U - \lambda_L} \int_{\lambda_L}^{\lambda_U} \tau_{FW1}(\lambda, m_1) \tau_{FW2}(\lambda, m_2) d\lambda > \tau_{MIN} > 0,$$

$$\forall m_1, m_2 = 1, \ldots, M.$$

The combined transmission is $\tau_C(\lambda, j) = \tau_{FW1}(\lambda, m_1) \tau_{FW2}(\lambda, m_2)$ where j=a measurement index of $j=1, \ldots, J$ measurements and the filter wheel combinations or indexes are described by $m_1 = \text{ceil}(j/M)$ and $m_2 = ((j-1) \bmod M) + 1$ for $j = 1, \ldots, J$ or alternatively $j = (m_1 - 1)M + m_2$.

This means that if the first filter wheel 16 turns only one index position, the second filter wheel 18 turns M index positions, where M=8 in the case of the spectrometer 10.

The filter wheels 16, 18 are followed by the spectral band-pass filter 20 having transmission $\tau_F(\lambda)$ to remove out-of-band light. This filter should have zero transmission outside the band $\lambda_L \leq \lambda \leq \lambda_U$. The detector 24 responsivity is $R(\lambda)$ with zero mean Gaussian noise n(t) and the detector pre-amplifier 26 gain is $A_V$. $\tau_{L1}$ and $\tau_{L2}$ are the transmission of the collecting optics 12 and the focusing optics 22 respectively. The output of the detector 24, for a certain filter-wheel combination measurement $j=1, \ldots, J$, and as a function of time t is then given by $$d(t, j) = A_V \int_{\lambda_L}^{\lambda_U} \tau_{L1} \tau_{L2} \tau_C(\lambda, j) \tau_F(\lambda) R(\lambda) TL(\lambda) d\lambda + A_V n(t).$$

Here T is the throughput of the spectrometer 10 and $L(\lambda)$ is the spectral radiance which is being measured.

For a physical signal model, the output of the detector 24 given above can be approximated as $$d(t, j) \approx A_V \tau_{L1} \tau_{L2} T \Delta\lambda \sum_{i=1}^{N} \tau_C(\lambda_i, j) \tau_F(\lambda_i) R(\lambda_i) L(\lambda_i) + A_V n(t)$$

with the wavelength range $\lambda_L, \ldots, \lambda_U$ divided into N bands, centred at $\lambda_i$ (a discrete wavelength measured in meter), i=1, ..., N, each band of width $\Delta\lambda$. If required more accurate integration methods can be used, such as Simpson's method. After sampling, a detector measurement can be written as $$d_j \approx A_V \tau_{L1} \tau_{L2} T \Delta\lambda \sum_{i=1}^{N} \tau_C(\lambda_i, j) \tau_F(\lambda_i) R(\lambda_i) L(\lambda_i) + v_j$$

where $v_j$ is sampled noise.

Figure 3:
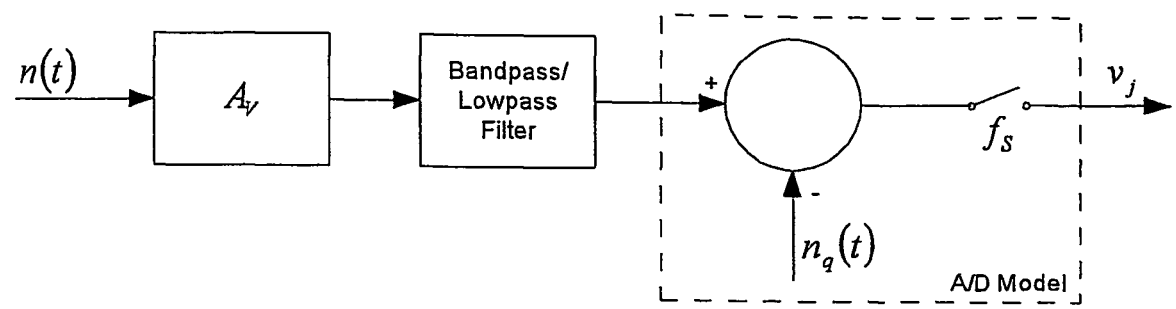
FIG. 3 shows a schematic representation of a noise model used by the spectrometers of FIGS. 1 and 2.

A noise model is shown in FIG. 3 of the drawings. In FIG. 3, n(t) is band-limited white noise and $n_q(t)$ is quantisation noise, which is assumed to have uniform distribution over the quantisation interval. The sampled noise is denoted by $v_j$ with noise power $\sigma^2$. It is required that the noise be independent and identically distributed between samples. In other words the noise covariance is of the form $E\{vv'\} = \sigma^2 I$, where I is a J×J identity matrix.

The spectral bands are modified by the optical transmission of components in the path of incident spectral radiation and the responsivity of the detector 24. In order to model this, a set of (1×N) spectral sampling vectors, $b_j$, that summarise conversion from spectral radiance to voltage for each measurement, is defined. Each element of this vector is given by $$b_{ji} = A_V \tau_{L1} \tau_{L2} T \Delta\lambda \tau_C(\lambda_i, j) \tau_F(\lambda_i) R(\lambda_i)$$

The detector signal can now be represented, using vector notation as $$d_j = b_j s + v_j$$

$$\text{where } s = \begin{bmatrix} L(\lambda_1) \\ \vdots \\ L(\lambda_N) \end{bmatrix} \cdot (N \times 1)$$

The non-linear detector responsivity and filter wheel transmission is captured by the vector $b_j$ which allows a simplified linear model to be used.

The signal processing problem is to determine the unknown radiance vector s using the signal model presented above. To achieve this, the following matrix and vector forms are used:

A spectral sampling matrix, $$B = \begin{bmatrix} b_1 \\ \vdots \\ b_J \end{bmatrix},$$

(J×N matrix) detector measurements, $$d = \begin{bmatrix} d_1 \\ \vdots \\ d_J \end{bmatrix} \text{ and } (J \times 1)$$

$$\text{noise } v = \begin{bmatrix} v_1 \\ \vdots \\ v_J \end{bmatrix} \cdot (J \times 1)$$

The physical signal model presented above can then be represented in compact form as $$d = Bs + v.$$

In the case where J>N, the estimate or measurement of the spectrum can be formulated as an optimisation problem $$\hat{s} = \arg\min_{x} E\{[d - Bx][d - Bx]\}.$$

The solution to this problem, as described in L. L. Scharf, *Statistical Signal processing: Detection, Estimation, and Time Series Analysis*, Addison-Wesley Publishing Company, 1991, is $$\hat{s} = [B'B]^{-1}B'd.$$

Numerically stable ways of calculating this are available in the art, e.g. as described in chapter 2 of L. L. Scharf, *Statistical Signal processing: Detection, Estimation, and Time Series Analysis*, Addison-Wesley Publishing Company, 1991. Performing the operation B'B is described in more detail later.

Since spectral sampling vectors are constant for a given set of filter wheels 16,18, the matrix $$G = [B'B]^{-1}B' \quad (N \times J \text{ matrix})$$

(the so-called pseudo-inverse) is constant and can be pre-calculated. In the case where J=N, the recovery matrix is the usual inverse (provided it exists) i.e. $G = B^{-1}$. The spectral estimate or measurement can be obtained more succinctly from $$\hat{s} = Gd.$$

It is to be appreciated that, if this estimate is to be used in further linear processing (such as might be the case with some of the conventional hyper-spectral detection algorithms), this processing could be combined to reduce computational time.

Figure 4:
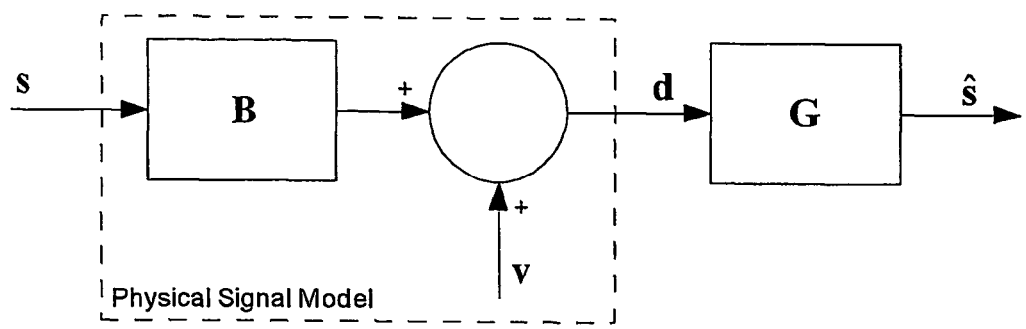
FIG. 4 shows a schematic representation of a signal processing model used by the spectrometers of FIGS. 1 and 2.

A spectrometer signal-processing model is shown in FIG. 4 of the drawings. It shows the physical signal model $$d = Bs + v$$

that describes how measurements are related to the incident spectrum and the recovery process $$\hat{s} = Gd.$$

Figure 5:
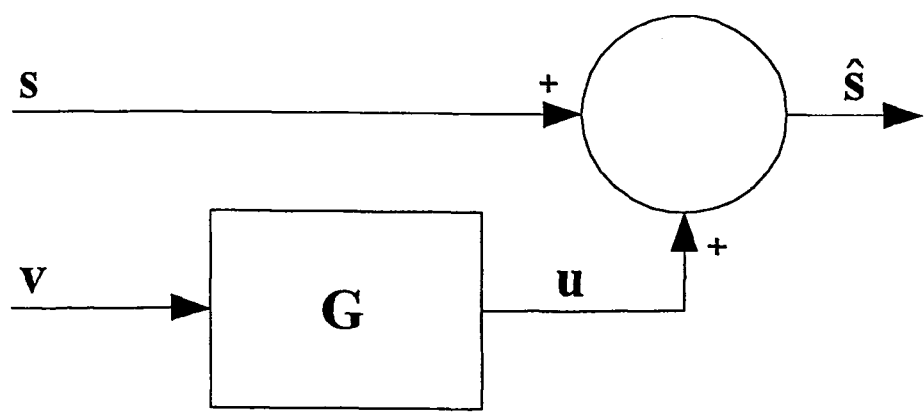
FIG. 5 shows a schematic representation of an alternate signal model used by the spectrometers of FIGS. 1 and 2, illustrating an estimation of an incident spectrum given a true spectrum and noise.

If the physical signal model is substituted into the recovery equation, the following is obtained $$\hat{s} = s + Gv$$
$$= s + u$$

where the transformed noise is defined as u=Gv. This is an alternate signal model, illustrated in FIG. 5 of the drawings. It describes how an estimate or measurement of the spectrum is obtained given the true spectrum and noise. The noise, v, is essentially of unknown distribution. For the spectrometer 10, it is required that the noise be independent and identically distributed between samples. In other words the noise covariance is of the form $E\{vv'\}=\sigma^2 I$, where I is the J×J identity matrix.

The covariance of the noise that is transformed into the estimate of the spectrum is $$E\{uu'\} = E\{Gvv'G'\}$$
$$= GE\{vv'\}G'$$
$$= \sigma^2 (B'B)^{-1}$$

and it will be useful in the following paragraphs (numerically stable ways of calculating this are described below). It is to be appreciated that the transformed noise covariance can be calculated without estimating the spectrum or calculating G.

A useful measure of the performance of the spectrometer 10 is the signal to noise ratio (SNR). The SNR can be considered at the detector 24 and after recovery. These results are summarised in Table 1, Table 2 and Table 3.

TABLE 1

Spectrum and Detector Signal Power.

| Signal | Power |
| --- | --- |
| True spectrum s | s's |
| Noise-less detector signal Bs | s'B'Bs |

TABLE 2

Noise and transformed noise Power.

| Noise | Power |
| --- | --- |
| Measurement noise v | $tr\{E\{vv'\}\} = J\sigma^2$ |
| Transformed noise u | $tr\{E\{uu'\}\} = \sigma^2 tr\{(B'B)^{-1}\} = \sigma^2 tr\{\Lambda^2\}$ |

TABLE 3

Detector and estimate SNR.

| | SNR |
| --- | --- |
| Detector SNR ($SNR_D$) | $\dfrac{s'B'Bs}{J\sigma^2}$ |
| Estimate SNR ($SNR_E$) | $\dfrac{s's}{\sigma^2 tr\{(B'B)^{-1}\}} = \dfrac{s's}{\sigma^2 tr\{\Lambda^2\}}$ |

Performing the operation B'B is essentially a squaring operation which doubles the dynamic range of floating point representation. When such a matrix is inverted, numerical inaccuracies may occur if this product is ill-conditioned. There are at least two ways around this:

Using the QR decomposition and

Using the singular value decomposition (SVD).

A background discussion of both methods can be found in chapter 2 of L. L. Scharf, *Statistical Signal processing: Detection, Estimation, and Time Series Analysis*, Addison-Wesley Publishing Company, 1991 and F. Deprettere, *SVD and Signal Processing: Algorithms, Applications and Architectures*, Elsevier Science Publishers, 1988. The SVD is the preferred method as it offers the following additional advantages over the QR decomposition:

It avoids the inversion of non-diagonal matrices.

It can be used to determine the condition number of B, a measure of performance of the given set of filters. The smaller the condition number the better the choice of filters.

It allows a trade-off of an approximation error against SNR.

The SVD can be used to represent the (J×N) spectral sampling matrix, B, as a product $$B = U\Sigma V'$$

where U and V are J×N and N×N orthogonal matrices. An orthogonal matrix has the property that $U^{-1}=U'$ or $UU'=I$. The matrix $\Sigma$ is a N×N diagonal matrix containing the singular values of B in descending order. Represented mathematically, $$\Sigma = \text{diag}\{\gamma_1, \ldots, \gamma_N\} \text{ and}$$

$$\gamma_1 \geq \gamma_2 \ldots \geq \gamma_N \geq 0.$$

The quantities of interest are expanded using the SVD, by $$(B'B)^{-1} = [(U\Sigma V')'(U\Sigma V')]^{-1}$$
$$= [V\Sigma^2 V']^{-1}$$
$$= V\Lambda^2 V'$$

where $\Lambda = \Sigma^{-1}$ or alternatively $$\Lambda = \text{diag}\{1/\gamma_1, \ldots, 1/\gamma_N\}.$$

This reduces the matrix inversion to taking the reciprocals of each singular value. The signal reconstruction matrix (pseudo-inverse) is given by $$G = [B'B]^{-1} B'$$
$$= V\Lambda^2 V'(U\Sigma V')'$$
$$= V\Lambda^2 \Sigma U'$$
$$= V\Lambda U'$$

For the transformed noise power, $$tr\{E\{uu'\}\} = \sigma^2 tr\{(B'B)^{-1}\}$$

-continued
$$= \sigma^2 \, tr\{V\Lambda^2 V'\}$$
$$= \sigma^2 \, tr\{\Lambda^2 V' V\}$$
$$= \sigma^2 \, tr\{\Lambda^2\}$$

The rotation rule for the trace has been used in the third step. If the trace is taken, then $$\sigma^2 \, tr\{\Lambda^2\} = \sum_{i=1}^{N} \frac{\sigma^2}{\gamma_i^2}$$

which is the sum of the detector noise power scaled by the square of the singular values. The largest singular value makes the smallest contribution to the sum and vice-versa. If the spread of singular values are small, the lowest transformed noise power is obtained. This characteristic is used to increase the SNR.

In order to further clarify this characteristic and its application, the SNR loss is defined as the ratio of SNR of the estimated spectrum to the SNR at the detector 24. A SNR loss lower bound is derived in terms of the condition number as $$\frac{SNR_E}{SNR_D} \geq \frac{1}{(cond(B))^2} = \frac{\gamma_N^2}{\gamma_1^2}$$

where the condition number, given as $$cond(B) = \frac{\gamma_1}{\gamma_N}$$

is an indication of transformed power. The derivation of the SNR loss lower bound is described in more detail below. If the condition number is large, the transformed noise power will be large and consequently the SNR loss will be high. By definition of the singular values, $\gamma_1 \geq \gamma_2 \ldots \geq \gamma_N \geq 0$ it is noted that for minimum SNR loss, it is required that $cond(B)=1$ or equal singular values with a minimum SNR loss of $$\frac{SNR_E}{SNR_D} = 1$$

when B is orthogonal. Therefore, whatever the SNR is at the detector, one cannot expect it to get better after recovery, but it could get much worse if B is ill-conditioned. This is one of the reasons why the multiplex advantage of the spectrometer 10 is of importance since in practice $cond(B)>1$.

The effects of encoding by means of filters and the conversion process (collecting and focusing optics, spectral band-pass filter and the detector) on the signal to noise ratio (SNR) can be examined by factorising the B matrix as $B=B_E B_C$, where $$B_C = A_{V_{L1}} \tau_{L2} T \Delta \lambda \mathrm{diag}\{\tau_F(\lambda_1) R(\lambda_1), \ldots, \tau_F(\lambda_N) R(\lambda_N)\} \text{ and}$$

$$B_E = \begin{bmatrix} \tau_C(\lambda_1, 1) & \cdots & \tau_C(\lambda_N, 1) \\ \vdots & & \vdots \\ \tau_C(\lambda_1, J) & \cdots & \tau_C(\lambda_N, J) \end{bmatrix}.$$

The N×N diagonal matrix $B_C$ describes the optical transmission and conversion of the optical signal with the exception of the spectral encoding filters. These are described separately in a J×N spectral encoding matrix $B_E$. The condition number of B relates detector SNR to the estimate SNR (recovered signal). This result is now extended to the factorisation. It can be shown that $cond(B) \leq cond(B_E)cond(B_C)$. When considering a diagonal matrix $A \in R^{N \times N}$ such that $A = \mathrm{diag}\{a_1, \ldots, a_N\}$ and using the definitions hereinafter used in the derivation of SNR lower bound, then $$cond(A) = \|A\|_2 \|A^{-1}\|_2$$

As it is known that (see the derivation of SNR lower bound hereinafter)

$$\|A\|_2 = \max_i |a_i|$$

and hence $$\|A^{-1}\|_2 = \max_i \left|\frac{1}{a_i}\right| = \frac{1}{\min_i |a_i|}$$

so that $$cond(A) = \frac{\max_i |a_i|}{\min_i |a_i|}.$$

and using the result above for the condition number of a diagonal matrix, $$cond(B_C) = \frac{\max_i |\tau_F(\lambda_i) R(\lambda_i)|}{\min_i |\tau_F(\lambda_i) R(\lambda_i)|}.$$

Ideally $cond(B)=1$ can be achieved if both $cond(B_C)$ and $cond(B_E)$ are 1. The former requirement is equivalent to saying that the combined transmission of the collecting optics, spectral band-pass filter and detector must have a flat spectral response.

This result separates the SNR loss into two components: the encoding loss and the conversion loss. It can be used to determine the optimum detector operating bandwidth for a specified SNR using the condition number.

Discarding some of the smaller singular values may result in a reduction in transformed noise power, or a corresponding increase in SNR. The N−r smallest singular values are discarded in the following manner:

$$\Sigma_r = \mathrm{diag}\{\gamma_1, \ldots, \gamma_r, 0, \ldots, 0\} \text{ and }$$

$$\Lambda_r = \mathrm{diag}\{1/\gamma_1, \ldots, 1/\gamma_r, 0, \ldots, 0\}.$$

The question is how well can the spectrum still be measured or estimated. Based on what is set out above, the recovered signal $\hat{s}_r = G_r d$ and $G_r = V\Lambda_r U'$. The subscript indicates that only the r largest singular values are used. Expanding, $$\hat{s}_r = G_r(Bs + v)$$
$$= (V\Lambda_r U')(U\Sigma V')s + G_r v$$
$$= V\Lambda_r \Sigma V's + u_r$$

where $u_r = G_r v$.

If r=N, the signal would be perfectly reconstructed, since $$\Lambda\Sigma = I$$

and then $$\hat{s}_N = VIV's + u_N$$
$$= s + u$$
$$= \hat{s}$$

which illustrates that the results are consistent.

For r<N, an approximation error (bias) is made. It is necessary to quantify this error in order to trade it off against the SNR improvement. The mean square error can be used as a metric of the total error, defined as $$MSE(r) = E\{[s - \hat{s}_r]'[s - \hat{s}_r]\}$$
$$= E\{s'V(I - \Lambda_r\Sigma)V's\} + \sigma^2 \, tr\{\Lambda_r^2\}$$

The derivation of the second step is described in more detail below. The first term is the bias squared while the second term is the transformed noise variance. The approximation error is the result of not completely projecting the true spectrum into the orthogonal space defined by V. The approximation effectively reduces the rank of B from N to r.

For system level design of a spectrometer such as the spectrometer 10, it is important to have some measure of computational, memory and data rate requirements for an image of size X×Y pixels with N spectral bands. Only the signal recovery part of the algorithm is considered for real-time implementation. If it is assumed that the area detector 24 has a frame rate of $f_R$, then for a full data cube: Every $J/f_R$ seconds a hyper-spectral image (HSI) is captured. A total of JNXY floating point multiply-accumulate (MA) operations are required.

The computational rate is $NXYf_R$ floating point operations per second (FLOPS), counting each MA as one operation. The area detector data rate is $XYf_R$ words per second.

The data cube occupies 4NXY bytes where it is assumed a single precision floating point and that intermediate results are stored in the same memory as the final result. The hyper-spectral camera data rate is $4NXYf_R/J$ bytes/second.

If a typical example with the parameters indicated in Table 4 is considered, the requirements in terms of processing rates and memory shown in Table 5 are obtained, which are quite feasible with contemporary digital signal processors and memory technology.

TABLE 4

Example parameters.

| Parameter | Value |
| --- | --- |
| N | 50 |
| J | 100 |
| $f_R$ | 25 |

TABLE 5

Performance for example parameters - point and image spectrometers.

| | (X, Y) = (1, 1) | (X, Y) = (512, 512) |
| --- | --- | --- |
| HSI capture time | 4 s | 4 s |
| Total MA operations | 5000 FLOP | 1310 MFLOP |
| Computational rate | 1250 FLOPS | 328 MFLOPS |
| Detector/Area detector data rate | 25 words/second | 6.6 Megawords/second |
| HSI Storage | 200 B | 50 MB |
| HSI data rate | 50 B/s | 12.5 MB/s |

It is preferred to select or design the filter transmissions of the filters of the spectrometer 10 for each measurement to maximise the signal to noise ratio over wavelength. The sampling vectors $b_j$ are a non-linear function of the filter transmissions. The noise is transformed by G, which is a function of the matrix B. The optimisation problem can be stated mathematically as $$\tau_C(\lambda, j) = \arg\max_\Theta \frac{E\{s's\}}{\sigma^2 \, tr\{\Lambda^2\}}$$

or in words: find the set of filters or filter transmissions from the space Θ, and hence B, so as to maximise the signal (including any wavelength dependent losses) to noise ratio of the estimate.

Clearly the space Θ will be large and ways of reducing this space based on physical and mathematical requirements and performance requirements should be implemented. A first requirement is that the transmission is constrained to $0 \leq \tau_C(\lambda, j) \leq 1$. The next requirement is that the product B'B must be invertible. This requires that B have at least rank (B)=N. In other words, N linearly independent vectors are needed as a basis—all the row vectors can then be formed from linear combinations of these. With the SVD algorithm described above, this requirement can be relaxed from N to r.

Furthermore, if an orthogonal matrix B can be found, then cond(B)=1, and the abovementioned optimisation problem is solved. As a result of the constraints on the transmission functions, it is only possible to approach the minimum, and not to achieve cond(B)=1.

When considering the implementation of the filter transmissions using optical thin film technology, there are two routes for determining the filter transmissions:

Select a set of orthogonal functions that maximise the estimate SNR and attempt to implement these or Optimise the thin film design parameters so as to maximise the estimate SNR directly.

In the first case it is assumed that the implementation technology has an underlying parametric form that can produce the desired transmission functions. This may only lead to an approximation of the required transmission functions. It is clear that from an implementation point of view functions with discontinuities should be avoided. In the second case, the filter transmission is not specified explicitly. This approach requires an intimate knowledge of thin film theory and is not discussed in any further detail.

A set of functions in terms of wavelength is presented hereunder. It should however be noted that these could just as well have been formulated in terms of wavenumber. In fact, it might be desirable to do so from the point of view of thin film design.

The continuous spectrum is sampled at N discrete points, each band of width $\Delta\lambda$. It is necessary to be able to reconstruct the original signal from the sampled version. Spectral frequency is first defined as the number of cycles of a certain quantity (transmission, radiance, etc.) occurring over a given wavelength band. Note that is not necessarily the same as the wavenumber for a given wavelength. The spectral sampling frequency is thus $f_S = 1/\Delta\lambda$.

From Nyquist's theorem, it is known that in order to meet the objective of reconstructing the spectrum from the sampled version, there should not be any signal component above half the spectral sampling frequency $f \leq f_S/2$.

For simplicity it is assumed that J=N. There are two cases:

One filter per measurement (High performance). An encoding transmission of the form $\tau_C(\lambda,j) = \alpha + \beta\phi(\lambda,j)$ then exists, where $0 \leq \alpha \leq 1$ and $0 \leq \beta \leq 1$ and $\phi(\lambda,j)$ is the function to be determined.

From Fourier theory it is known that sine and cosine functions can be used. Furthermore, it is possible to construct a set of functions, some of which are orthogonal, using only sine or only cosine or both. The latter two are used because they minimise the number of transmission variations with respect to wavelength. The first set of cosine functions is $$\phi(\lambda_i, j) = \cos\left(\frac{\pi}{N}i(j-1)\right) \quad j = 1, \ldots, J.$$

For the mixed set, the definition of $$M = \text{floor}\left(\frac{N}{2}\right).$$

The set of orthogonal functions is given by $$\phi(\lambda_i, j) = \begin{cases} \cos\left(\frac{2\pi}{N}i(j-1)\right) & j = 1, \ldots, M+1 \\ \sin\left(\frac{2\pi}{N}i(j-M-1)\right) & j = M+2, \ldots, N \end{cases}$$

These functions represent a set of orthogonal functions that can be used and are by no means the only ones. There may be other types of functions, which are also suitable such as wavelets. The sine and cosine set forms a complete orthogonal space. If only the cosines from this set are used, sine functions cannot be represented since these are orthogonal. This means that additional higher frequency cosines must be used to achieve the same SNR—this is typically a limitation of FTIRs. It is to be noted that the cosine set are at half the frequency when compared to the cosines in the mixed set.

One filter combination per measurement (Reduced cost). A combined transmission of the from $\tau_C(\lambda,j) = \tau_{FW1}(\lambda,m_1) \tau_{FW2}(\lambda,m_2)$ exists in this situation, where $$\tau_{FW1}(\lambda,m_1) = \alpha + \beta\phi_1(\lambda,m_1),$$

$$\tau_{FW2}(\lambda,m_2) = \alpha + \beta\phi_2(\lambda,m_2),$$

$0 \leq \alpha \leq 1$ and $0 \leq \beta \leq 1$ and $\phi_1(\lambda,m_1)$, $\phi_1(\lambda,m_2)$ are the functions to be determined.

The following set of functions $$\phi_1(\lambda_i, m_1) = \cos\left(\frac{2\pi}{N}im_1 + \theta_1(m_1)\right)$$

$$\phi_2(\lambda_i, m_2) = \cos\left(\frac{4\pi}{N}i(m_2 - 1) + \theta_2(m_2)\right)$$

are not orthogonal but can yield a fairly low condition number if the phase vectors are chosen such that $$\begin{bmatrix} \theta_1 \\ \theta_2 \end{bmatrix} = \arg\min\{\text{tr}\{\Lambda^2\}\}.$$

This last condition is equivalent to maximising the multiplex advantage. It should be noted that for the double filter wheel more measurements than spectral bins are required, i.e., J>N. It is possible to meet this requirement and still have less than N filters in total.

The encoding functions above represent transmission targets for the design of optical thin film filters. In practice, one will be able to achieve transmissions that are close but not exactly the same. In fact, the transmissions will contain spectral frequency components at the desired frequencies and other additional frequency components or harmonics. These harmonics cause aliasing. This problem can be overcome by spectral over-sampling. Such over-sampling may also be required if the approximations in the physical signal model and the spectrum estimation optimisation problem set out hereinbefore are not sufficiently accurate.

The B matrix can be over-sampled in the ratio 1:Q by inserting Q−1 evenly spaced points in between the original points at wavelength intervals of $$\delta\lambda = \frac{\Delta\lambda}{Q}.$$

This spectrally over-sampled matrix is denoted as $B_O$ and is a $J \times N_O$ matrix where $N_O = QN$ and $J < N_O$. The wavelength increment changes from $\Delta\lambda$ to $\delta\lambda$ for $B_O$. This over-sampling is based on measured values of the optics, encoding filters and responsivity and is thus an extension of the calibration process that would have been required at N points for B anyway.

Using the over-sampled system matrix and the $N_O \times 1$ over-sampled signal vector $s_O$, the detector output can be more accurately calculated with $$d = B_O s_O + v.$$

The spectrum can be recovered using $$\hat{s}_O = G_O d$$

where the reconstruction matrix is given by $$G_O = (B'\text{hd } OB_O)^{-1} B'_O. \qquad (N_O \times J \text{ matrix})$$

This is calculated in a similar way to the calculation of B'B described earlier, although the SVD matrices may be different sizes. It should be pointed out that this is an under-determined system and in fact the mean square error described earlier in relation to the SVD method is relevant here. Clearly, $\text{rank}(B_O) < J$ and forms a "reduced" rank system with $r = J$. Thus there will be some approximation error, but also some gain in SNR—an indirect consequence of over-sampling.

In order to get back to the original N points it will be necessary to sub-sample $\hat{s}_O$. This can be done, with reduced computational time, by extracting every Q rows of $G_O$ to form a new matrix. This will also result in reduced approximation error.

In practice the transmission of the optics of a spectrometer such as the spectrometer 10 is not known exactly, and the broadband optical filter transmissions and the detector responsivity have some variation. Three forms of calibration can be distinguished:

Dark offset calibration.

Coarse or model calibration. In this case it is assumed that the models are very inaccurate models or that the spectral sampling matrix B, is unknown.

Fine calibration. The purpose of this calibration is to make the instrument traceable to some standard. It assumes that the spectral sampling matrix is known approximately.

Dark Offset Calibration: The purpose of this calibration is to determine the offset introduced by the detector 24, the amplifier 26, filters and the A/D converter 30, with zero spectral radiance. This can be expressed as follows:

Set $s = 0$ and average over a large number of detector measurements—this will be referred to as the dark offset $d_O$. This can also be written as a vector $$d_O = \begin{bmatrix} d_O \\ \vdots \\ d_O \end{bmatrix} \qquad (J \times 1)$$

Model Calibration: The aim of model calibration is to characterise the entire system in a single model—the spectral sampling matrix B given a specific instrument. Clearly B contains JN unknowns. However, since control is exercised over the source during calibration, the problem can be split into J independent problems. The task at hand is then to determine $b_j$ given a number of known sources whose spectrum is known.

Several reference sources $S_k$ for $k = 1, \ldots, K$, with known spectrum are required. At least as many sources are required as there are spectral bands i.e. $K \geq N$. A source matrix $S = [s_1 \ldots s_K]$ ($N \times K$ matrix) then exist.

From the physical signal model, for a given filter combination j, $$d_k = b_j s_k + v_k$$

and in matrix notation $$d = b_j S + v$$

where the detector measurement vector and noise vector are $(K \times 1)$ vectors. The spectral sampling vector is $$b_j = S'(SS')^{-1} d.$$

The requirement for the reference sources $s_k$, is only that each be different spectrally, with known spectrum. A monochromater or some other means could generate these. There is not a specific need for $s_k$ to be narrow band signal.

Fine Calibration: It is possible that the "reference sources" used in the previous section may not be accurately calibrated, and therefore a method for fine calibration may be needed. A traceable reference' source $s = s_R$ can be used. Next, an averaged estimate of the spectrum s is obtained, assuming a spectral correction of the form $$\check{s}_i = \kappa_i \hat{s}_i, \forall i = 1, \ldots, N.$$

where š is the calibrated estimate and the calibration factor is given by $$\kappa_i = \frac{s_{Ri}}{\hat{s}_i}.$$

The derivation of SNR lower bound is now described. The following metrics are helpful with reference to G. H. Golub and C. F von Loan, *Matrix Computations*, John Hopkins University Press, 1983:

$$\text{a Euclidian norm } \|x\|_2 = \left[\sum_{i=1}^{N} x_i^2\right]^{1/2} \text{ for } x \in R^N,$$

$$\text{a matrix norm } \|A\|_2 = \sup_{x \neq 0} \frac{\|Ax\|_2}{\|x\|_2} \text{ for } A \in R^{J \times N}$$

The relations x'x=$\|x\|_2^2$ and

A generalised form of the Cauchy-Schwartz inequality, $\|Ax\|_2 \leq \|A\|_2 \|x\|_2$ are also used.

As set out above, SNR at the detector is $$SNR_D = \frac{s'B'Bs}{E\{v'v\}} = \frac{\|Bs\|_2^2}{E\|v\|_2^2}$$

and the estimate SNR is $$SNR_E = \frac{s's}{E\{u'u\}} = \frac{\|s\|_2^2}{E\|u\|_2^2}.$$

The SNR loss is defined as $$\frac{SNR_E}{SNR_D} = \frac{\|s\|_2^2}{E\|u\|_2^2} \frac{E\|v\|_2^2}{\|Bs\|_2^2} \geq \frac{\|s\|_2^2}{\|G\|_2^2 E\|v\|_2^2} \frac{E\|v\|_2^2}{\|B\|_2^2 \|s\|_2^2} = \frac{1}{\|G\|_2^2 \|B\|_2^2}$$

The condition number for a rectangular matrix is defined as cond(B)=$\|B\|_2 \|G\|_2$.

Simplifying, $\|B\|_2 = \|U\Sigma V'\|_2 = \|\Sigma\|_2 = \gamma_1$ and similarly for $$\|G\|_2 = \|V \Lambda U'\|_2 = \|\Lambda\|_2 = \frac{1}{\gamma_N},$$

so that $cond(B) = \frac{\gamma_1}{\gamma_N}$.

So, clearly the SNR loss is bounded by the reciprocal of the square of the condition number $$\frac{SNR_E}{SNR_D} \geq \frac{1}{(cond(B))^2} = \frac{\gamma_N^2}{\gamma_1^2}$$

By definition of the singular values, $\gamma_1 \geq \gamma_2 \ldots \geq \gamma_N \geq 0$ it is clear that for minimum SNR loss, it is required that cond(B)=1 or equal singular values.

If it is assumed that B=Q an orthogonal matrix i.e. Q'Q=I and Q'=Q$^{-1}$, then the minimum SNR loss is $$\frac{SNR_E}{SNR_D} = \frac{\|s\|_2^2}{E\|Q'v\|_2^2} \frac{E\|v\|_2^2}{\|Qs\|_2^2} = \frac{\|s\|_2^2}{E\|v\|_2^2} \frac{E\|v\|_2^2}{\|s\|_2^2} = 1.$$

The derivation of mean square error as a function of the rank r is now described. The difference $$s - \hat{s}_r = s - (V\Lambda_r \Sigma V's + u_r)$$
$$= (I - V\Lambda_r \Sigma V')s - u_r$$
$$= V(I - \Lambda_r \Sigma)V's - u_r$$

can be considered and then the following product, substituting $u_r = V\Lambda_r U'v$ in the cross-terms, can be formed $$(s-\hat{s}_r)'(s-\hat{s}_r) = [s'V(I-\Lambda_r\Sigma)V' - u_r'][V(I-\Lambda_r\Sigma)V's - u_r]$$
$$= s'V(I-\Lambda_r\Sigma)^2 V's - s'V(I-\Lambda_r\Sigma)V'u_r - u_r'V(I-\Lambda_r\Sigma)V's + u_r'u_r$$
$$= s'V(I-\Lambda_r\Sigma)^2 V's - s'V(I-\Lambda_r\Sigma)\Lambda_r U'v - v'U\Lambda_r(I-\Lambda_r\Sigma)V's + u_r'u_r$$

The middle two terms are zero because $\Lambda_r \Sigma$=diag$\{1, \ldots, 1, 0, \ldots, 0\}$, (r'1's and N-r'0's)

and therefore

I-$\Lambda_r \Sigma$=diag$\{0, \ldots, 0, 1, \ldots, 1\}$, (r'0's and N-r'1's).

Therefore $(I-\Lambda_r\Sigma)\Lambda_r=0.$

Taking the expectation of the product, $MSE(r)=E\{(s-\hat{s}_r)'(s-\hat{s}_r)\}=E\{s'V(I-\Lambda_r\Sigma)V's\}+E\{u_r'u_r\}$ and, as $E\{u_r'u_r\}$=tr$\{E\{u_r u_r'\}\}$=$\sigma^2$tr$\{\Lambda_r^2\}$, and substituting, the final result is $MSE(r)=E\{s'V(I-\Lambda_r\Sigma)V's\}+\sigma^2 tr\{\Lambda_r^2\}.$ The QR decomposition for calculating (B'B)$^{-1}$ is now described. The spectral sampling matrix can be written as a product of two matrices

B=QU where Q is a J×J unitary matrix and U is a J×N upper triangular matrix. This is called the QR decomposition. In fact, the latter matrix can be partitioned as $$U = \begin{bmatrix} U_1 \\ 0 \end{bmatrix}$$

if rank(B)=N so that $U_1$ is a N×N upper triangular matrix. The matrix product can be expressed as $$B'B = U'Q'QU = U'U = U'_1 U_1$$

and its inverse as $$(B'B)^{-1} = (U'_1 U_1)^{-1}$$
$$= U_1^{-1}(U_1^{-1})'$$

Since $U_1$ is upper triangular, its inverse can be more easily calculated.

EXAMPLE 1

Figure 8:
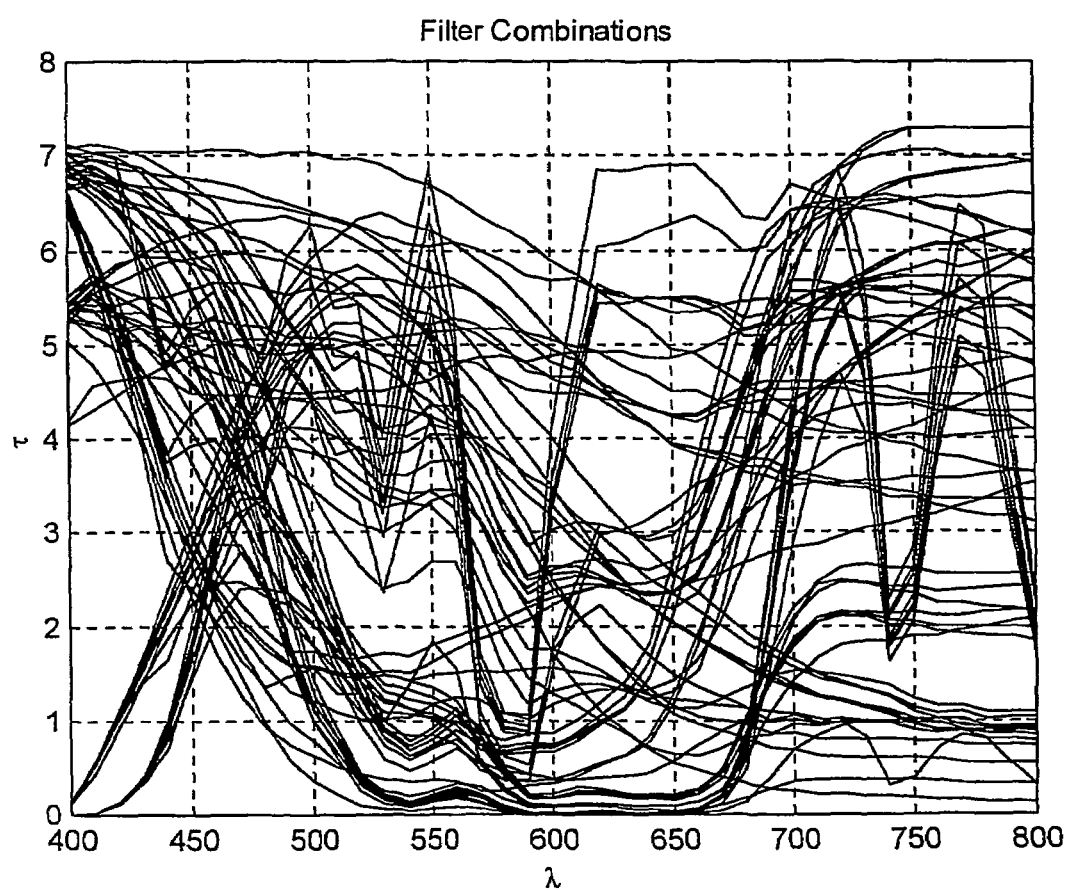
FIG. 8 shows the transmission of the sixty four combinations of the filters of the first and second filter wheels of the spectrometer of FIG. 1.

A simulated example with reference to the spectrometer 10 using commercially available filters from Schott Glaswerke is provided. The example illustrates the general concept of the invention and does not provide an optimum design for the spectrometer 10. Hence, some parameters in Table 6 were chosen arbitrarily. The transmission of the filters on each wheel 16, 18 is shown in FIGS. 6 and 7, while FIG. 8 is the combined transmission of the sixty-four filter combinations. The approach described above has been used to recover the signal. There has been no attempt to use the orthogonality conditions described—this would result in better performance without any approximation error. In the recovered signal shown in FIG. 10, r=26, roughly corresponding to the minimum of the mean square error in FIG. 8. This shows that even if a less than optimal set of filters is used, the spectrum can still be estimated.

TABLE 6

Parameters used in the example.

| | | |
|---|---|---|
| N | Number of spectral bands. | 41 |
| J | Number of measurements used to estimate the spectrum. | 64 |
| M | Number of filters on a filter wheel. | 8 |
| $\lambda_L, \lambda_U$ | Upper and lower operational wavelength. | 400-800 nm |
| $\tau_{L1}$ | Transmission of collecting optics. | 0.95 |
| $\tau_{L2}$ | Transmission of focusing optics. | 0.95 |
| $\tau_F(\lambda)$ | Spectral band-pass filter. | 0.95 |
| T | Radiometer throughput. | 1 |
| $R(\lambda)$ | Detector responsivity (V/W). | 1 |
| $A_V$ | Detector Pre-amp voltage gain (V/V). | 1 |

EXAMPLE 2

In this example one thin film filter is used per measurement. The cosine function set described earlier has been used as a design target for the thin film transmissions. The parameters used for this spectrometer are listed in Table 67. The Essential Macleod V8.03e software was used to design the thin film filters.

TABLE 7

Parameters used in the example

| | | |
|---|---|---|
| N | Number of spectral bands. | 20 |
| J | Number of measurements used to estimate the spectrum. | 20 |
| $\lambda_L, \lambda_U$ | Upper and lower operational wavelength. | 600-800 nm |
| $\Delta\lambda$ | Wavelength resolution. | 10 nm |
| $f_s$ | Sampling frequency | 100 c/µm |
| Q | Over-sampling factor | 4 |
| $\tau_{L1}$ | Transmission of collecting optics. | 0.95 |
| $\tau_{L2}$ | Transmission of focusing optics. | 0.95 |
| $\tau_F(\lambda)$ | Spectral band-pass filter. | 0.95 |
| T | Radiometer throughput. | 1 |
| $R(\lambda)$ | Detector responsivity (V/W). | 1 |
| $A_V$ | Detector Pre-amp voltage gain (V/V). | 1 |
| $\alpha$ | Transmission function offset | 0.5 |
| $\beta$ | Transmission function swing | 0.49 |

The condition number of the over-sampled matrix is cond $(B_O)$=27.3 for this example. The reference SNR, $SNR_R$=118.2 while the recovered signal to mean square error is 533.7 for the results shown in FIG. 15, with a resulting gain of 4.5. This is related to $SNRE/SNR_R$ but also includes the approximation error or bias term of the estimate. The predicted SNR gain ($SNR_E/SNR_R$) is 3.1. The average signal to mean square error gain over 1000 runs was 3.3 with a standard deviation of 1.2.

The Instrument Line Shape (ILS) is the response of a spectrometer to a spectral impulse or dirac-delta. It gives an indication of leakage into adjacent spectral bins caused by making only a small number of measurements. It is normal to define a ripple ratio as the ratio of the maximum side-lobe amplitude to the main-lobe amplitude. The ILS for the spectrometer of this example is shown in FIG. 16. The non-zero width of the input spectrum, $\Delta\lambda$ (at 715 nm), has not been corrected for. The main lobe to side lobe ratio is 6.2 without any window functions.

While 21 filters were designed, only the first three and the last filter are shown in the drawings. The design for the third filter is given in Table 8. The design consists of the chemicals, and corresponding thickness, that are deposited on a substrate.

TABLE 8

Example of thin film design for j = 3.

| Layer Incident Medium | Material Air | Thickness (nm) |
|---|---|---|
| 1 | TiO2 | 115.06 |
| 2 | SiO2 | 205.06 |
| 3 | TiO2 | 90.27 |
| 4 | SiO2 | 104.41 |
| 5 | TiO2 | 157.88 |
| 6 | SiO2 | 210.43 |
| 7 | TiO2 | 143.57 |
| 8 | SiO2 | 15.08 |
| 9 | TiO2 | 35.3 |
| 10 | SiO2 | 41.08 |
| 11 | TiO2 | 43.8 |
| 12 | SiO2 | 193.39 |
| 13 | TiO2 | 91.26 |
| 14 | SiO2 | 351.61 |
| Substrate | BK7 | |

Advantages of the spectrometer of the invention, as illustrated, include that it has a multiplex advantage and a good signal to noise ratio as a result of the high throughput of the broadband filters employed to obtain measurements of an incident spectrum. It is also expected that the spectrometer of the invention, as illustrated, will be much less costly to manufacture and more robust than conventional spectrometers such as FTIR spectrometers, since it contains no high tolerance components. Furthermore, there are no field of view dependent wavenumber shifts as with FTIR spectrometers.

The invention claimed is:

1. A spectrometer which includes
   a filter arrangement, in addition to any optional filters for limiting an operational wavelength range of the spectrometer, the filter arrangement including a filter set with a plurality of unique and individual broadband optical filters or broadband optical filter areas each of known transmission and being located or selectively locatable in a path of collected incident spectral radiation;
   at least one detector arranged to measure the spectral radiation passing through at least one of the broadband filters located in the path of collected incident spectral radiation; and
   signal-processing means for recovering the spectrum of the collected spectral radiation from measurements by the detector.

2. A spectrometer as claimed in claim 1, in which all the broadband filters or filter areas are linearly independent.

3. A spectrometer as claimed in claim 1, in which the filter arrangement includes at least two filter sets arranged one in front of the other to provide broadband filter combinations.

4. A spectrometer as claimed in claim 3, in which each filter set is in the form of a filter wheel.

5. A spectrometer as claimed in claim 3, which includes locating means for selectively locating the broadband filters or filter areas in the path of collected incident spectral radiation, the locating means being configured to locate one filter or filter area on one filter set in the path of collected incident spectral radiation whilst successively locating each filter or filter area of the other filter set in the path of collected incident spectral radiation, thereby forming a plurality of broadband filter combinations.

6. A spectrometer as claimed in claim 3, in which each broadband filter combination is unique and individual and each broadband filter combination is linearly independent of every other broadband filter combination.

7. A spectrometer as claimed in claim 3, which is configured to measure N wavelength bands and which includes J broadband filters or filter areas or J filter or filter area combinations, where $J \geq N \geq 2$ the filter arrangement including only two filter sets, each filter set comprising M broadband filters or filter areas where $J=M^2$.

8. A spectrometer as claimed in claim 1, in which the filter arrangement is configured to allow the spectrometer of the invention to operate in the visual and near infrared spectrums.

9. A spectrometer as claimed in claim 1, in which the filters or filter areas are thin film filters or absorption filters.

10. A spectrometer as claimed in claim 1, which includes a detector associated with each broadband filter or filter area or with each filter or filter area combination which can exist simultaneously, allowing simultaneous sampling of each filter or filter area or each actual filter or filter area combination.

11. A spectrometer as claimed in claim 1, in which the signal-processing means is configured, for J measured digital signals received by it and each digital signal corresponding to a measurement taken for a particular filter or filter combination, to arrange the J measured digital signals in a vector d, where the vector $d=Bs+v$ and B is a matrix whose row vectors represent the effects of any hardware components, used to obtain the measured digital signals, on the measured digital signals, s is the incident spectrum and v is a noise vector, and to multiply a signal recovery matrix C with the vector d of the measured digital signals, to provide the measured incident spectrum $\hat{S}$, i.e. $\hat{S}=G\ d$ where
   $G=V\Lambda_r U'$ or the pseudo inverse of B;
   $\Lambda_r = \text{diag}\{1/\gamma_1, \ldots, 1/\gamma_r, 0, \ldots, 0\}$, the subscript r indicating that only the r largest singular values are used; and
   $B=U\Sigma V'$, the singular value decomposition of B, where U and V are $J \times N$ and $N \times N$ orthogonal matrices, the matrix $\Sigma$ is a $N \times N$ diagonal matrix containing the singular values of B in descending order, i.e. $\Sigma=\text{diag}\{\gamma_1, \ldots, \gamma_N\}$, $\gamma_1 \geq \gamma_2 \ldots \geq \gamma_N \geq 0$, and r is an integer in the range $1 \leq r \leq N$ selected to minimize the measurement error.

12. A spectrometer which includes a filter arrangement, in addition to any optional filters for limiting an operational wavelength range of the spectrometer, the filter arrangement comprising a filter set with a plurality of unique and individual broadband optical filters or broadband optical filter areas each of known transmission and being located or selectively locatable in a path of collected incident spectral radiation.

* * * * *